US009495446B2

(12) United States Patent  
Martin et al.

(10) Patent No.: US 9,495,446 B2
(45) Date of Patent: Nov. 15, 2016

(54) METHOD AND DEVICE FOR PUBLISHING CROSS-NETWORK USER BEHAVIORAL DATA

(75) Inventors: Anthony Martin, Los Altos, CA (US); David L. Goulden, Redwood City, CA (US); Dominic V. Bennett, Los Altos, CA (US); Roger Petersen, Palo Alto, CA (US); Remigiusz K. Paczkowski, Belmont, CA (US)

(73) Assignee: GULA CONSULTING LIMITED LIABILITY COMPANY, Dover, DE (US)

( * ) Notice: Subject to any disclaimer, the term of this patent is extended or adjusted under 35 U.S.C. 154(b) by 1173 days.

(21) Appl. No.: 12/715,311

(22) Filed: Mar. 1, 2010

(65) Prior Publication Data

US 2010/0306053 A1 Dec. 2, 2010

Related U.S. Application Data

(63) Continuation of application No. 11/226,066, filed on Sep. 14, 2005.

(60) Provisional application No. 60/637,684, filed on Dec. 20, 2004.

(51) Int. Cl.
*G06F 17/30* (2006.01)
*G06Q 10/06* (2012.01)
*G06Q 30/02* (2012.01)

(52) U.S. Cl.
CPC ... *G06F 17/30702* (2013.01); *G06F 17/30867* (2013.01); *G06Q 10/06* (2013.01); *G06Q 30/0255* (2013.01)

(58) Field of Classification Search
USPC .......................... 707/628; 709/224; 715/745
See application file for complete search history.

(56) References Cited

U.S. PATENT DOCUMENTS

| | | | |
|---|---|---|---|
| 4,455,083 | A | 6/1984 | Elmes |
| 4,575,579 | A | 3/1986 | Simon et al. |
| 4,719,567 | A | 1/1988 | Whittington et al. |
| 4,775,935 | A | 10/1988 | Yourick |
| 4,782,449 | A | 11/1988 | Brinker et al. |
| 4,799,146 | A | 1/1989 | Chauvel |
| 4,850,007 | A | 7/1989 | Marino et al. |
| 4,977,594 | A | 12/1990 | Shear |
| 5,027,400 | A | 6/1991 | Baji et al. |

(Continued)

FOREIGN PATENT DOCUMENTS

| | | |
|---|---|---|
| EP | 0631231 | 12/1994 |
| EP | 0822535 | 2/1998 |

(Continued)

OTHER PUBLICATIONS

Claypool, Mark, et al., "Inferring User Interest", IEEE Internet Computing, vol. 5, Issue 6, Nov./Dec. 2001, pp. 32-39.*

(Continued)

*Primary Examiner* — Joshua Bullock
(74) *Attorney, Agent, or Firm* — Brundidge & Stanger, P.C.

(57) ABSTRACT

The present invention relates to summarizing cross-network user behavioral data. The summarizing cross-network user behavioral data may particularly include publishing the data to one or more data structures that become accessible to a server hosting an authorized domain when a user accesses the authorized domain.

20 Claims, 7 Drawing Sheets

(56) References Cited

U.S. PATENT DOCUMENTS

| | | |
|---|---|---|
| 5,029,104 A | 7/1991 | Dodson et al. |
| 5,093,718 A | 3/1992 | Hoarty et al. |
| 5,099,420 A | 3/1992 | Barlow et al. |
| 5,105,184 A | 4/1992 | Pirani et al. |
| 5,159,669 A | 10/1992 | Trigg et al. |
| 5,165,012 A | 11/1992 | Crandall et al. |
| 5,196,838 A | 3/1993 | Meier et al. |
| 5,202,961 A | 4/1993 | Mills et al. |
| 5,220,420 A | 6/1993 | Hoarty et al. |
| 5,220,516 A | 6/1993 | Dodson et al. |
| 5,220,564 A | 6/1993 | Tuch et al. |
| 5,231,499 A | 7/1993 | Trytko |
| 5,247,517 A | 9/1993 | Ross et al. |
| 5,253,341 A | 10/1993 | Rozmanith et al. |
| 5,268,963 A | 12/1993 | Monroe et al. |
| 5,283,639 A | 2/1994 | Esch et al. |
| 5,283,731 A | 2/1994 | Lalonde et al. |
| 5,285,442 A | 2/1994 | Iwamura et al. |
| 5,297,249 A | 3/1994 | Bernstein et al. |
| 5,305,195 A | 4/1994 | Murphy |
| 5,307,456 A | 4/1994 | MacKay |
| 5,313,455 A | 5/1994 | van der Wal et al. |
| 5,315,580 A | 5/1994 | Phaal |
| 5,319,455 A | 6/1994 | Hoarty et al. |
| 5,321,740 A | 6/1994 | Gregorek et al. |
| 5,325,423 A | 6/1994 | Lewis |
| 5,325,483 A | 6/1994 | Ise et al. |
| 5,327,554 A | 7/1994 | Palazzi et al. |
| 5,333,237 A | 7/1994 | Stefanopoulos et al. |
| 5,347,632 A | 9/1994 | Filepp et al. |
| 5,355,472 A | 10/1994 | Lewis |
| 5,355,501 A | 10/1994 | Gross et al. |
| 5,361,091 A | 11/1994 | Hoarty et al. |
| 5,361,199 A | 11/1994 | Shoquist et al. |
| 5,361,393 A | 11/1994 | Rossillo |
| 5,367,621 A | 11/1994 | Cohen et al. |
| 5,373,375 A | 12/1994 | Weldy |
| 5,392,447 A | 2/1995 | Schlack et al. |
| 5,412,720 A | 5/1995 | Hoarty |
| 5,418,549 A | 5/1995 | Anderson et al. |
| 5,438,518 A | 8/1995 | Bianco et al. |
| 5,442,771 A | 8/1995 | Filepp et al. |
| 5,446,919 A | 8/1995 | Wilkins |
| 5,469,553 A | 11/1995 | Patrick |
| 5,481,741 A | 1/1996 | McKaskle et al. |
| 5,483,466 A | 1/1996 | Kawahara et al. |
| 5,491,785 A | 2/1996 | Robson et al. |
| 5,499,340 A | 3/1996 | Barritz |
| 5,500,890 A | 3/1996 | Rogge et al. |
| 5,515,098 A | 5/1996 | Carles |
| 5,515,270 A | 5/1996 | Weinblatt |
| 5,515,490 A | 5/1996 | Buchanan et al. |
| 5,517,612 A | 5/1996 | Dwin et al. |
| 5,524,195 A | 6/1996 | Clanton, III et al. |
| 5,524,197 A | 6/1996 | Uya et al. |
| 5,530,472 A | 6/1996 | Bregman et al. |
| 5,530,759 A | 6/1996 | Braudaway et al. |
| 5,530,852 A | 6/1996 | Meske et al. |
| 5,532,735 A | 7/1996 | Blahut et al. |
| 5,541,986 A | 7/1996 | Hou |
| 5,544,302 A | 8/1996 | Nguyen |
| 5,544,320 A | 8/1996 | Konrad |
| 5,548,745 A | 8/1996 | Egan et al. |
| 5,563,804 A | 10/1996 | Mortensen et al. |
| 5,564,043 A | 10/1996 | Siefert |
| 5,572,643 A | 11/1996 | Judson |
| 5,579,381 A | 11/1996 | Courville et al. |
| 5,583,560 A | 12/1996 | Florin et al. |
| 5,583,763 A | 12/1996 | Atcheson et al. |
| 5,584,025 A | 12/1996 | Keithley et al. |
| 5,590,046 A | 12/1996 | Anderson et al. |
| 5,594,509 A | 1/1997 | Florin et al. |
| 5,594,779 A | 1/1997 | Goodman |
| 5,596,718 A | 1/1997 | Boebert et al. |
| 5,602,905 A | 2/1997 | Mettke |
| 5,604,542 A | 2/1997 | Dedrick |
| 5,606,359 A | 2/1997 | Youden et al. |
| 5,608,850 A | 3/1997 | Robertson |
| 5,615,131 A | 3/1997 | Mortensen et al. |
| 5,615,325 A | 3/1997 | Peden |
| 5,617,526 A | 4/1997 | Oran et al. |
| 5,621,456 A | 4/1997 | Florin et al. |
| 5,627,886 A | 5/1997 | Bowman |
| 5,629,978 A | 5/1997 | Blumhardt et al. |
| 5,630,081 A | 5/1997 | Rybicki et al. |
| 5,635,979 A | 6/1997 | Kostreski et al. |
| 5,638,443 A | 6/1997 | Stefik et al. |
| 5,642,484 A | 6/1997 | Harrison, III et al. |
| 5,649,186 A | 7/1997 | Ferguson |
| 5,657,450 A | 8/1997 | Rao et al. |
| 5,664,948 A | 9/1997 | Dimitriadis et al. |
| 5,673,322 A | 9/1997 | Pepe et al. |
| 5,675,510 A | 10/1997 | Coffey et al. |
| 5,680,562 A | 10/1997 | Conrad et al. |
| 5,682,525 A | 10/1997 | Bouve et al. |
| 5,684,715 A | 11/1997 | Palmer |
| 5,684,969 A | 11/1997 | Ishida |
| 5,701,451 A | 12/1997 | Rogers et al. |
| 5,704,017 A | 12/1997 | Heckerman et al. |
| 5,706,434 A | 1/1998 | Kremen et al. |
| 5,706,502 A | 1/1998 | Foley et al. |
| 5,708,709 A | 1/1998 | Rose |
| 5,708,780 A | 1/1998 | Levergood et al. |
| 5,710,884 A | 1/1998 | Dedrick |
| 5,710,918 A | 1/1998 | Lagarde et al. |
| 5,712,979 A | 1/1998 | Graber et al. |
| 5,715,453 A | 2/1998 | Stewart |
| 5,717,860 A | 2/1998 | Graber et al. |
| 5,717,923 A | 2/1998 | Dedrick |
| 5,721,827 A | 2/1998 | Logan et al. |
| 5,721,908 A | 2/1998 | Lagarde et al. |
| 5,724,521 A | 3/1998 | Dedrick |
| 5,724,556 A | 3/1998 | Souder et al. |
| 5,724,567 A | 3/1998 | Rose et al. |
| 5,727,129 A | 3/1998 | Barrett et al. |
| 5,727,159 A | 3/1998 | Kikinis |
| 5,734,863 A | 3/1998 | Kodosky et al. |
| 5,737,619 A | 4/1998 | Judson |
| 5,737,739 A | 4/1998 | Shirley et al. |
| 5,740,252 A | 4/1998 | Minor et al. |
| 5,740,549 A | 4/1998 | Reilly et al. |
| 5,742,768 A | 4/1998 | Gennaro et al. |
| 5,742,905 A | 4/1998 | Pepe et al. |
| 5,745,681 A | 4/1998 | Levine et al. |
| 5,751,956 A | 5/1998 | Kirsch |
| 5,754,830 A | 5/1998 | Butts et al. |
| 5,754,938 A | 5/1998 | Herz et al. |
| 5,754,939 A | 5/1998 | Herz et al. |
| 5,758,111 A | 5/1998 | Shiratori et al. |
| 5,758,257 A | 5/1998 | Herz et al. |
| 5,760,767 A | 6/1998 | Shore et al. |
| 5,761,601 A | 6/1998 | Nemirofsky et al. |
| 5,761,662 A | 6/1998 | Dasan |
| 5,768,508 A | 6/1998 | Eikeland |
| 5,768,510 A | 6/1998 | Gish |
| 5,774,670 A * | 6/1998 | Montulli ............... 709/227 |
| 5,781,894 A | 7/1998 | Petrecca et al. |
| 5,787,253 A | 7/1998 | McCreery et al. |
| 5,787,254 A | 7/1998 | Maddalozzo, Jr. et al. |
| 5,793,972 A | 8/1998 | Shane |
| 5,794,210 A | 8/1998 | Goldhaber et al. |
| 5,794,259 A | 8/1998 | Kikinis |
| 5,796,952 A | 8/1998 | Davis et al. |
| 5,801,685 A | 9/1998 | Miller et al. |
| 5,802,320 A | 9/1998 | Baehr et al. |
| 5,805,735 A | 9/1998 | Chen et al. |
| 5,805,815 A | 9/1998 | Hill |
| 5,809,242 A | 9/1998 | Shaw et al. |
| 5,809,481 A | 9/1998 | Baron et al. |
| 5,809,512 A | 9/1998 | Kato |
| 5,812,642 A | 9/1998 | Leroy |
| 5,812,769 A | 9/1998 | Graber et al. |
| 5,819,047 A | 10/1998 | Bauer et al. |
| 5,819,092 A | 10/1998 | Ferguson et al. |

(56) References Cited

U.S. PATENT DOCUMENTS

| | | | |
|---|---|---|---|
| 5,822,526 A | 10/1998 | Waskiewicz | |
| 5,832,502 A | 11/1998 | Durham et al. | |
| 5,835,087 A | 11/1998 | Herz et al. | |
| 5,835,092 A | 11/1998 | Boudreau et al. | |
| 5,835,722 A | 11/1998 | Bradshaw et al. | |
| 5,838,458 A | 11/1998 | Tsai | |
| 5,848,246 A | 12/1998 | Gish | |
| 5,848,396 A * | 12/1998 | Gerace | 705/7.33 |
| 5,848,397 A | 12/1998 | Marsh et al. | |
| 5,850,352 A | 12/1998 | Moezzi et al. | |
| 5,850,433 A | 12/1998 | Rondeua | |
| 5,854,897 A | 12/1998 | Radziewicz et al. | |
| 5,855,008 A | 12/1998 | Goldhaber et al. | |
| 5,861,880 A | 1/1999 | Shimizu et al. | |
| 5,861,883 A | 1/1999 | Cuomo et al. | |
| 5,862,260 A | 1/1999 | Rhoads | |
| 5,862,325 A | 1/1999 | Reed et al. | |
| 5,864,823 A | 1/1999 | Levitan | |
| 5,870,769 A | 2/1999 | Freund | |
| 5,872,850 A | 2/1999 | Klein et al. | |
| 5,875,296 A | 2/1999 | Shi et al. | |
| 5,877,766 A | 3/1999 | Bates et al. | |
| 5,878,231 A | 3/1999 | Baehr et al. | |
| 5,883,955 A | 3/1999 | Ronning | |
| 5,884,025 A | 3/1999 | Baehr et al. | |
| 5,886,683 A | 3/1999 | Tognazzini et al. | |
| 5,887,133 A | 3/1999 | Brown et al. | |
| 5,890,152 A | 3/1999 | Rapaport et al. | |
| 5,892,917 A | 4/1999 | Myerson | |
| 5,893,053 A | 4/1999 | Trueblood | |
| 5,893,118 A | 4/1999 | Sonderegger | |
| 5,894,554 A | 4/1999 | Lowery et al. | |
| 5,897,622 A | 4/1999 | Blinn et al. | |
| 5,898,434 A | 4/1999 | Small et al. | |
| 5,901,287 A | 5/1999 | Bull et al. | |
| 5,903,892 A | 5/1999 | Hoffert et al. | |
| 5,905,492 A | 5/1999 | Straub et al. | |
| 5,905,800 A | 5/1999 | Moskowitz et al. | |
| 5,907,838 A | 5/1999 | Miyasaka et al. | |
| 5,913,040 A | 6/1999 | Rakavy et al. | |
| 5,918,012 A | 6/1999 | Astiz et al. | |
| 5,918,013 A | 6/1999 | Mighdoll et al. | |
| 5,918,014 A | 6/1999 | Robinson | |
| 5,918,214 A | 6/1999 | Perkowski | |
| 5,920,697 A | 7/1999 | Masters et al. | |
| 5,923,845 A | 7/1999 | Kamiya et al. | |
| 5,923,853 A | 7/1999 | Danneels | |
| 5,929,850 A | 7/1999 | Broadwin et al. | |
| 5,930,446 A | 7/1999 | Kanda | |
| 5,930,700 A | 7/1999 | Pepper et al. | |
| 5,930,801 A | 7/1999 | Falkenhainer et al. | |
| 5,931,901 A | 8/1999 | Wolfe et al. | |
| 5,931,907 A | 8/1999 | Davies et al. | |
| 5,933,811 A | 8/1999 | Angles et al. | |
| 5,933,832 A | 8/1999 | Suzuoka et al. | |
| 5,936,679 A | 8/1999 | Kasahara et al. | |
| 5,937,037 A | 8/1999 | Kamel et al. | |
| 5,937,390 A | 8/1999 | Hyodo | |
| 5,937,392 A | 8/1999 | Alberts | |
| 5,937,411 A | 8/1999 | Becker | |
| 5,943,478 A | 8/1999 | Aggarwal et al. | |
| 5,944,791 A | 8/1999 | Scherpbier | |
| 5,946,646 A | 8/1999 | Schena et al. | |
| 5,946,664 A | 8/1999 | Ebisawa | |
| 5,946,697 A | 8/1999 | Shen | |
| 5,948,061 A | 9/1999 | Merriman et al. | |
| 5,951,300 A | 9/1999 | Brown | |
| 5,956,693 A | 9/1999 | Geerlings | |
| 5,956,716 A | 9/1999 | Kenner et al. | |
| 5,958,008 A | 9/1999 | Pogrebisky et al. | |
| 5,958,015 A | 9/1999 | Dascalu | |
| 5,959,621 A | 9/1999 | Nawaz et al. | |
| 5,959,623 A | 9/1999 | Van Hoff et al. | |
| 5,960,409 A | 9/1999 | Wexler | |
| 5,961,593 A | 10/1999 | Gabber et al. | |
| 5,961,602 A | 10/1999 | Thompson et al. | |
| 5,961,603 A | 10/1999 | Kunkel et al. | |
| 5,963,909 A | 10/1999 | Warren et al. | |
| 5,963,915 A | 10/1999 | Kirsch | |
| 5,966,121 A | 10/1999 | Hubbell et al. | |
| 5,970,473 A | 10/1999 | Gerszber et al. | |
| 5,974,219 A | 10/1999 | Fujita et al. | |
| 5,974,451 A | 10/1999 | Simmons | |
| 5,978,807 A | 11/1999 | Mano et al. | |
| 5,978,833 A | 11/1999 | Pashley et al. | |
| 5,978,836 A | 11/1999 | Ouchi | |
| 5,978,841 A | 11/1999 | Berger | |
| 5,978,842 A | 11/1999 | Noble et al. | |
| 5,983,227 A | 11/1999 | Nazem et al. | |
| 5,983,244 A | 11/1999 | Nation | |
| 5,983,268 A | 11/1999 | Freivald et al. | |
| 5,987,466 A | 11/1999 | Greer et al. | |
| 5,987,606 A | 11/1999 | Cirasole et al. | |
| 5,991,735 A * | 11/1999 | Gerace | 705/10 |
| 5,991,799 A | 11/1999 | Yen et al. | |
| 5,995,597 A | 11/1999 | Woltz et al. | |
| 5,995,943 A | 11/1999 | Bull et al. | |
| 5,996,007 A | 11/1999 | Klug et al. | |
| 5,996,011 A | 11/1999 | Humes | |
| 5,999,526 A | 12/1999 | Garland et al. | |
| 5,999,731 A | 12/1999 | Yellin et al. | |
| 5,999,740 A | 12/1999 | Rowley | |
| 5,999,912 A | 12/1999 | Wodarz et al. | |
| 6,002,401 A | 12/1999 | Baker | |
| 6,006,241 A | 12/1999 | Purnaveja et al. | |
| 6,006,252 A | 12/1999 | Wolfe | |
| 6,006,265 A | 12/1999 | Rangan et al. | |
| 6,009,236 A | 12/1999 | Mishima et al. | |
| 6,009,409 A | 12/1999 | Adler et al. | |
| 6,009,410 A | 12/1999 | LeMole et al. | |
| 6,011,537 A | 1/2000 | Slotznick | |
| 6,012,083 A | 1/2000 | Savitzky et al. | |
| 6,014,502 A | 1/2000 | Moraes | |
| 6,014,638 A | 1/2000 | Burge et al. | |
| 6,014,698 A | 1/2000 | Griffiths | |
| 6,014,711 A | 1/2000 | Brown | |
| 6,016,509 A | 1/2000 | Dedrick | |
| 6,020,884 A | 2/2000 | MacNaughton et al. | |
| 6,023,726 A | 2/2000 | Saksena | |
| 6,025,837 A | 2/2000 | Matthew, III et al. | |
| 6,025,886 A | 2/2000 | Koda | |
| 6,026,368 A | 2/2000 | Brown et al. | |
| 6,026,413 A | 2/2000 | Challenger et al. | |
| 6,026,433 A | 2/2000 | D'arlach et al. | |
| 6,026,933 A | 2/2000 | King et al. | |
| 6,029,045 A | 2/2000 | Picco et al. | |
| 6,029,141 A | 2/2000 | Bezos et al. | |
| 6,029,145 A | 2/2000 | Barritz | |
| 6,029,182 A | 2/2000 | Nehab et al. | |
| 6,029,195 A | 2/2000 | Herz | |
| 6,035,332 A | 3/2000 | Ingrassia, Jr. et al. | |
| 6,047,318 A | 4/2000 | Becker et al. | |
| 6,047,327 A | 4/2000 | Tso et al. | |
| 6,049,821 A | 4/2000 | Theriault et al. | |
| 6,052,709 A | 4/2000 | Paul | |
| 6,052,717 A | 4/2000 | Reynolds et al. | |
| 6,052,730 A | 4/2000 | Felciano et al. | |
| 6,055,572 A | 4/2000 | Saksena | |
| 6,058,141 A | 5/2000 | Barger et al. | |
| 6,061,054 A | 5/2000 | Jolly | |
| 6,061,659 A | 5/2000 | Murray | |
| 6,061,716 A | 5/2000 | Moncreiff | |
| 6,065,024 A | 5/2000 | Renshaw | |
| 6,065,056 A | 5/2000 | Bradshaw et al. | |
| 6,067,559 A | 5/2000 | Allard et al. | |
| 6,067,561 A | 5/2000 | Dillon | |
| 6,067,565 A | 5/2000 | Horvitz | |
| 6,070,140 A | 5/2000 | Tran | |
| 6,073,105 A | 6/2000 | Sutcliffe et al. | |
| 6,073,167 A | 6/2000 | Poulton et al. | |
| 6,073,241 A | 6/2000 | Rosenberg et al. | |
| 6,076,166 A | 6/2000 | Moshfeghi et al. | |
| 6,078,916 A | 6/2000 | Culliss | |
| 6,081,840 A | 6/2000 | Zhao | |

(56) References Cited

U.S. PATENT DOCUMENTS

| | | |
|---|---|---|
| 6,084,581 A | 7/2000 | Hunt |
| 6,085,193 A | 7/2000 | Malkin et al. |
| 6,085,226 A | 7/2000 | Horvitz |
| 6,085,242 A | 7/2000 | Chandra |
| 6,088,731 A | 7/2000 | Kiraly et al. |
| 6,091,411 A | 7/2000 | Straub et al. |
| 6,092,196 A | 7/2000 | Reiche |
| 6,094,655 A | 7/2000 | Rogers et al. |
| 6,094,677 A | 7/2000 | Capek et al. |
| 6,098,064 A | 8/2000 | Pirolli et al. |
| 6,098,065 A | 8/2000 | Skillen et al. |
| 6,101,510 A | 8/2000 | Stone et al. |
| 6,108,637 A | 8/2000 | Blumenau |
| 6,108,691 A | 8/2000 | Lee et al. |
| 6,108,799 A | 8/2000 | Boulay et al. |
| 6,112,215 A | 8/2000 | Kaply |
| 6,112,246 A | 8/2000 | Horbal et al. |
| 6,115,680 A | 9/2000 | Coffee et al. |
| 6,119,098 A | 9/2000 | Guyot et al. |
| 6,119,165 A | 9/2000 | Li et al. |
| 6,122,632 A | 9/2000 | Botts et al. |
| 6,125,388 A | 9/2000 | Reisman |
| 6,128,655 A | 10/2000 | Fields et al. |
| 6,128,663 A | 10/2000 | Thomas |
| 6,133,912 A | 10/2000 | Montero |
| 6,133,918 A | 10/2000 | Conrad et al. |
| 6,134,380 A | 10/2000 | Kushizaki |
| 6,134,532 A | 10/2000 | Lazarus et al. |
| 6,138,146 A | 10/2000 | Moon et al. |
| 6,138,155 A | 10/2000 | Davis et al. |
| 6,141,010 A | 10/2000 | Hoyle |
| 6,144,944 A | 11/2000 | Kurtzman, II et al. |
| 6,151,596 A | 11/2000 | Hosomi |
| 6,154,738 A | 11/2000 | Call |
| 6,154,771 A | 11/2000 | Rangan et al. |
| 6,157,924 A | 12/2000 | Austin |
| 6,157,946 A | 12/2000 | Itakura et al. |
| 6,161,112 A | 12/2000 | Cragun et al. |
| 6,163,778 A | 12/2000 | Fogg et al. |
| 6,167,438 A | 12/2000 | Yates et al. |
| 6,167,453 A | 12/2000 | Becker et al. |
| 6,178,443 B1 | 1/2001 | Lin |
| 6,178,461 B1 | 1/2001 | Chan et al. |
| 6,182,066 B1 | 1/2001 | Marques |
| 6,182,097 B1 | 1/2001 | Hansen et al. |
| 6,182,122 B1 | 1/2001 | Berstis |
| 6,182,133 B1 | 1/2001 | Horvitz |
| 6,183,366 B1 | 2/2001 | Goldberg et al. |
| 6,185,558 B1 | 2/2001 | Bowman |
| 6,185,586 B1 | 2/2001 | Judson |
| 6,185,614 B1 | 2/2001 | Cuomo et al. |
| 6,191,782 B1 | 2/2001 | Mori et al. |
| 6,192,380 B1 | 2/2001 | Light et al. |
| 6,195,622 B1 | 2/2001 | Altschuler et al. |
| 6,198,906 B1 | 3/2001 | Boetje et al. |
| 6,199,079 B1 | 3/2001 | Gupta et al. |
| 6,202,093 B1 | 3/2001 | Bolam et al. |
| 6,204,840 B1 | 3/2001 | Petelycky et al. |
| 6,208,339 B1 | 3/2001 | Atlas et al. |
| 6,216,141 B1 | 4/2001 | Straub et al. |
| 6,216,212 B1 | 4/2001 | Challenger et al. |
| 6,219,676 B1 | 4/2001 | Reiner |
| 6,222,520 B1 | 4/2001 | Gerszberg et al. |
| 6,223,215 B1 * | 4/2001 | Hunt et al. ............... 709/217 |
| 6,233,564 B1 | 5/2001 | Schulze, Jr. |
| 6,237,022 B1 | 5/2001 | Bruck et al. |
| 6,249,284 B1 | 6/2001 | Bogdan |
| 6,253,188 B1 | 6/2001 | Witek et al. |
| 6,253,208 B1 | 6/2001 | Wittgreffe et al. |
| 6,266,058 B1 | 7/2001 | Meyer |
| 6,269,361 B1 | 7/2001 | Davis et al. |
| 6,275,854 B1 | 8/2001 | Himmel et al. |
| 6,279,112 B1 | 8/2001 | O'Toole et al. |
| 6,280,043 B1 | 8/2001 | Ohkawa |
| 6,285,987 B1 | 9/2001 | Roth et al. |
| 6,286,043 B1 | 9/2001 | Cuomo et al. |
| 6,286,045 B1 | 9/2001 | Griffiths et al. |
| 6,295,061 B1 | 9/2001 | Park et al. |
| 6,297,819 B1 | 10/2001 | Furst |
| 6,304,844 B1 | 10/2001 | Pan et al. |
| 6,308,202 B1 | 10/2001 | Cohn et al. |
| 6,311,194 B1 | 10/2001 | Sheth et al. |
| 6,314,451 B1 | 11/2001 | Landsman et al. |
| 6,314,457 B1 | 11/2001 | Schema et al. |
| 6,317,761 B1 | 11/2001 | Landsman et al. |
| 6,321,209 B1 | 11/2001 | Pasquali |
| 6,321,256 B1 | 11/2001 | Himmel et al. |
| 6,324,553 B1 | 11/2001 | Cragun et al. |
| 6,324,569 B1 | 11/2001 | Ogilvie et al. |
| 6,324,583 B1 | 11/2001 | Stevens |
| 6,327,574 B1 | 12/2001 | Kramer et al. |
| 6,327,617 B1 | 12/2001 | Fawcett |
| 6,332,127 B1 | 12/2001 | Bandera |
| 6,334,111 B1 | 12/2001 | Carrott |
| 6,335,963 B1 | 1/2002 | Bosco |
| 6,336,131 B1 | 1/2002 | Wolfe |
| 6,338,059 B1 | 1/2002 | Fields et al. |
| 6,338,066 B1 | 1/2002 | Martin et al. |
| 6,341,305 B2 | 1/2002 | Wolfe |
| 6,347,398 B1 | 2/2002 | Parthasarathy et al. |
| 6,351,279 B1 | 2/2002 | Sawyer |
| 6,351,745 B1 | 2/2002 | Itakura et al. |
| 6,353,834 B1 | 3/2002 | Wong et al. |
| 6,356,898 B2 | 3/2002 | Cohen et al. |
| 6,356,908 B1 | 3/2002 | Brown et al. |
| 6,360,221 B1 | 3/2002 | Gough et al. |
| 6,366,298 B1 | 4/2002 | Haitsuka |
| 6,370,527 B1 | 4/2002 | Singhal |
| 6,377,983 B1 | 4/2002 | Cohen et al. |
| 6,378,075 B1 | 4/2002 | Goldstein et al. |
| 6,381,735 B1 | 4/2002 | Hunt |
| 6,381,742 B2 | 4/2002 | Forbes et al. |
| 6,385,592 B1 | 5/2002 | Angles et al. |
| 6,392,668 B1 | 5/2002 | Murray |
| 6,393,407 B1 | 5/2002 | Middleton et al. |
| 6,393,415 B1 | 5/2002 | Getchius et al. |
| 6,397,228 B1 | 5/2002 | Lamburt et al. |
| 6,401,075 B1 | 6/2002 | Mason et al. |
| 6,415,322 B1 | 7/2002 | Jaye |
| 6,418,440 B1 | 7/2002 | Kuo et al. |
| 6,418,471 B1 | 7/2002 | Shelton et al. |
| 6,421,675 B1 | 7/2002 | Ryan et al. |
| 6,421,724 B1 | 7/2002 | Nickerson et al. |
| 6,421,729 B1 | 7/2002 | Paltenghe et al. |
| 6,434,745 B1 | 8/2002 | Conley, Jr. et al. |
| 6,437,802 B1 | 8/2002 | Kenny |
| 6,438,215 B1 | 8/2002 | Skladman et al. |
| 6,438,578 B1 | 8/2002 | Schmid et al. |
| 6,438,579 B1 | 8/2002 | Hosken |
| 6,441,832 B1 | 8/2002 | Tao et al. |
| 6,442,529 B1 | 8/2002 | Krishan et al. |
| 6,446,128 B1 | 9/2002 | Woods et al. |
| 6,449,657 B2 | 9/2002 | Stanbach, Jr. et al. |
| 6,452,612 B1 | 9/2002 | Holtz et al. |
| 6,457,009 B1 | 9/2002 | Bollay |
| 6,459,440 B1 | 10/2002 | Monnes et al. |
| 6,460,036 B1 | 10/2002 | Herz |
| 6,460,042 B1 | 10/2002 | Hitchcock et al. |
| 6,460,060 B1 | 10/2002 | Maddalozzo et al. |
| 6,466,918 B1 * | 10/2002 | Spiegel et al. ............... 705/7.29 |
| 6,466,970 B1 * | 10/2002 | Lee et al. ............... 709/217 |
| 6,477,550 B1 | 11/2002 | Balasubramaniam et al. |
| 6,477,575 B1 | 11/2002 | Koeppel et al. |
| 6,480,837 B1 | 11/2002 | Dutta |
| 6,484,148 B1 | 11/2002 | Boyd |
| 6,487,538 B1 | 11/2002 | Gupta et al. |
| 6,489,968 B1 * | 12/2002 | Ortega et al. ............... 715/713 |
| 6,490,722 B1 | 12/2002 | Barton et al. |
| 6,493,702 B1 | 12/2002 | Adar et al. |
| 6,496,931 B1 | 12/2002 | Rajchel et al. |
| 6,499,052 B1 | 12/2002 | Hoang et al. |
| 6,502,076 B1 | 12/2002 | Smith |
| 6,505,201 B1 | 1/2003 | Haitsuka |
| 6,513,052 B1 | 1/2003 | Binder |

(56) References Cited

U.S. PATENT DOCUMENTS

| | | |
|---|---|---|
| 6,513,060 B1 | 1/2003 | Nixon et al. |
| 6,516,312 B1 | 2/2003 | Kraft et al. |
| 6,523,021 B1 | 2/2003 | Monberg et al. |
| 6,526,411 B1 | 2/2003 | Ward |
| 6,529,903 B2 | 3/2003 | Smith et al. |
| 6,539,375 B2 | 3/2003 | Kawasaki |
| 6,539,424 B1 | 3/2003 | Dutta |
| 6,564,202 B1 | 5/2003 | Schuetze et al. |
| 6,567,850 B1 | 5/2003 | Rajan et al. |
| 6,567,854 B1 | 5/2003 | Olshansky et al. |
| 6,570,595 B2 | 5/2003 | Porter |
| 6,572,662 B2 | 6/2003 | Manohar et al. |
| 6,581,072 B1 * | 6/2003 | Mathur et al. ............... 707/711 |
| 6,584,479 B2 | 6/2003 | Chang et al. |
| 6,584,492 B1 | 6/2003 | Cezar et al. |
| 6,584,505 B1 | 6/2003 | Howard et al. |
| 6,594,654 B1 | 7/2003 | Salam et al. |
| 6,601,041 B1 | 7/2003 | Brown et al. |
| 6,601,057 B1 | 7/2003 | Underwood et al. |
| 6,601,100 B2 * | 7/2003 | Lee et al. ..................... 709/226 |
| 6,604,103 B1 | 8/2003 | Wolfe |
| 6,606,652 B1 | 8/2003 | Cohn et al. |
| 6,615,247 B1 | 9/2003 | Murphy |
| 6,622,168 B1 | 9/2003 | Datta |
| 6,631,360 B1 | 10/2003 | Cook |
| 6,642,944 B2 | 11/2003 | Conrad et al. |
| 6,643,696 B2 | 11/2003 | Davis et al. |
| 6,665,656 B1 | 12/2003 | Carter |
| 6,665,838 B1 | 12/2003 | Brown et al. |
| 6,678,731 B1 | 1/2004 | Howard et al. |
| 6,678,866 B1 | 1/2004 | Sugimoto et al. |
| 6,681,223 B1 | 1/2004 | Sundaresan |
| 6,681,247 B1 | 1/2004 | Payton |
| 6,686,931 B1 | 2/2004 | Bodnar |
| 6,687,737 B2 | 2/2004 | Landsman et al. |
| 6,691,106 B1 | 2/2004 | Sathyanarayan |
| 6,697,825 B1 | 2/2004 | Underwood et al. |
| 6,701,362 B1 * | 3/2004 | Subramonian et al. ...... 709/224 |
| 6,701,363 B1 | 3/2004 | Chiu et al. |
| 6,714,975 B1 | 3/2004 | Aggarwal et al. |
| 6,718,365 B1 | 4/2004 | Dutta |
| 6,721,741 B1 | 4/2004 | Eyal et al. |
| 6,721,795 B1 | 4/2004 | Eldreth |
| 6,725,269 B1 | 4/2004 | Megiddo |
| 6,725,303 B1 | 4/2004 | Hoguta et al. |
| 6,741,967 B1 | 5/2004 | Wu et al. |
| 6,757,661 B1 | 6/2004 | Blaser et al. |
| 6,760,746 B1 | 7/2004 | Schneider |
| 6,760,916 B2 | 7/2004 | Holtz et al. |
| 6,763,379 B1 | 7/2004 | Shuster |
| 6,763,386 B2 | 7/2004 | Davis et al. |
| 6,771,290 B1 | 8/2004 | Hoyle |
| 6,772,200 B1 | 8/2004 | Bakshi et al. |
| 6,785,659 B1 | 8/2004 | Landsman et al. |
| 6,785,723 B1 | 8/2004 | Genty et al. |
| 6,801,906 B1 * | 10/2004 | Bates et al. .................. 707/707 |
| 6,801,909 B2 | 10/2004 | Delgado et al. |
| 6,826,534 B1 | 11/2004 | Gupta et al. |
| 6,826,546 B1 | 11/2004 | Shuster |
| 6,827,669 B2 | 12/2004 | Cohen et al. |
| 6,847,969 B1 | 1/2005 | Mathai et al. |
| 6,848,004 B1 | 1/2005 | Chang et al. |
| 6,850,967 B1 | 2/2005 | Spencer et al. |
| 6,853,982 B2 | 2/2005 | Smith et al. |
| 6,857,024 B1 | 2/2005 | Chen et al. |
| 6,871,196 B1 * | 3/2005 | Chan et al. .................... 706/47 |
| 6,874,018 B2 | 3/2005 | Wu |
| 6,877,027 B1 | 4/2005 | Spencer et al. |
| 6,880,123 B1 | 4/2005 | Landsman |
| 6,882,981 B2 | 4/2005 | Philippe et al. |
| 6,892,181 B1 | 5/2005 | Megiddo et al. |
| 6,892,223 B1 | 5/2005 | Kawabata et al. |
| 6,892,226 B1 | 5/2005 | Tso et al. |
| 6,892,354 B1 | 5/2005 | Servan-Schreiber et al. |
| 6,904,408 B1 | 6/2005 | McCarthy et al. |
| 6,910,179 B1 | 6/2005 | Pennell et al. |
| 6,934,736 B2 | 8/2005 | Sears et al. |
| 6,938,027 B1 | 8/2005 | Barritz |
| 6,957,390 B2 | 10/2005 | Tamir et al. |
| 6,958,759 B2 | 10/2005 | Safadi et al. |
| 6,968,507 B2 | 11/2005 | Pennell et al. |
| 6,973,478 B1 | 12/2005 | Ketonen et al. |
| 6,976,053 B1 | 12/2005 | Tripp et al. |
| 6,976,090 B2 | 12/2005 | Ben-Shaul et al. |
| 6,990,633 B1 | 1/2006 | Miyasaka |
| 6,993,532 B1 | 1/2006 | Platt et al. |
| 7,003,734 B1 | 2/2006 | Gardner et al. |
| 7,016,887 B2 | 3/2006 | Stockfisch |
| 7,039,599 B2 | 5/2006 | Merriman et al. |
| 7,043,526 B1 | 5/2006 | Wolfe |
| 7,051,084 B1 | 5/2006 | Hayton et al. |
| 7,054,900 B1 | 5/2006 | Goldston |
| 7,065,550 B2 | 6/2006 | Raghunandan |
| 7,069,515 B1 | 6/2006 | Eagle et al. |
| 7,076,546 B1 | 7/2006 | Bates et al. |
| 7,085,682 B1 | 8/2006 | Heller et al. |
| 7,100,111 B2 | 8/2006 | McElfresh et al. |
| 7,133,924 B1 | 11/2006 | Rosenberg et al. |
| 7,136,875 B2 | 11/2006 | Anderson et al. |
| 7,149,791 B2 | 12/2006 | Sears et al. |
| 7,155,729 B1 | 12/2006 | Andrew et al. |
| 7,162,739 B2 | 1/2007 | Cowden et al. |
| 7,181,415 B2 | 2/2007 | Blaser et al. |
| 7,181,488 B2 | 2/2007 | Martin et al. |
| 7,194,425 B2 | 3/2007 | Nyhan |
| 7,254,547 B1 | 8/2007 | Beck et al. |
| 7,283,992 B2 | 10/2007 | Liu et al. |
| 7,346,606 B2 | 3/2008 | Bharat |
| 7,349,827 B1 | 3/2008 | Heller et al. |
| 7,363,291 B1 | 4/2008 | Page |
| 7,421,432 B1 | 9/2008 | Hoelzle et al. |
| 7,424,708 B2 | 9/2008 | Andersson et al. |
| 7,451,065 B2 | 11/2008 | Pednault et al. |
| 7,454,364 B2 | 11/2008 | Shkedi |
| 7,464,155 B2 | 12/2008 | Mousavi et al. |
| 7,480,862 B2 | 1/2009 | Cowden et al. |
| 7,512,603 B1 | 3/2009 | Veteska et al. |
| 7,630,986 B1 | 12/2009 | Herz |
| 7,743,340 B2 | 6/2010 | Horvitz et al. |
| 7,844,488 B2 | 11/2010 | Merriman et al. |
| 2001/0011226 A1 | 8/2001 | Greer et al. |
| 2001/0029527 A1 | 10/2001 | Goshen |
| 2001/0030970 A1 | 10/2001 | Wiryaman et al. |
| 2001/0032115 A1 | 10/2001 | Goldstein |
| 2001/0037240 A1 | 11/2001 | Marks et al. |
| 2001/0037325 A1 | 11/2001 | Biderman et al. |
| 2001/0037488 A1 | 11/2001 | Lee |
| 2001/0044795 A1 | 11/2001 | Cohen et al. |
| 2001/0047354 A1 | 11/2001 | Davis et al. |
| 2001/0049320 A1 | 12/2001 | Cohen et al. |
| 2001/0049321 A1 | 12/2001 | Cohen et al. |
| 2001/0049620 A1 | 12/2001 | Blasko |
| 2001/0049716 A1 | 12/2001 | Wolfe |
| 2001/0051559 A1 | 12/2001 | Cohen et al. |
| 2001/0053735 A1 | 12/2001 | Cohen et al. |
| 2001/0054020 A1 * | 12/2001 | Barth et al. ..................... 705/37 |
| 2002/0002483 A1 | 1/2002 | Siegel et al. |
| 2002/0002538 A1 | 1/2002 | Ling |
| 2002/0004754 A1 | 1/2002 | Gardenswartz |
| 2002/0007307 A1 | 1/2002 | Miller |
| 2002/0007309 A1 * | 1/2002 | Reynar ........................... 705/14 |
| 2002/0007317 A1 | 1/2002 | Callaghan et al. |
| 2002/0008703 A1 | 1/2002 | Merrill et al. |
| 2002/0010626 A1 | 1/2002 | Agmoni |
| 2002/0010757 A1 | 1/2002 | Granik et al. |
| 2002/0010776 A1 | 1/2002 | Lerner |
| 2002/0016736 A1 | 2/2002 | Cannon et al. |
| 2002/0019763 A1 | 2/2002 | Linden et al. |
| 2002/0019834 A1 | 2/2002 | Vilcauskas, Jr. et al. |
| 2002/0023159 A1 | 2/2002 | Vange et al. |
| 2002/0026390 A1 | 2/2002 | Ulenas et al. |
| 2002/0032592 A1 | 3/2002 | Krasnick et al. |
| 2002/0035568 A1 | 3/2002 | Benthin |
| 2002/0038363 A1 | 3/2002 | MacLean |

(56) References Cited

U.S. PATENT DOCUMENTS

| | | |
|---|---|---|
| 2002/0040374 A1 | 4/2002 | Kent |
| 2002/0042750 A1 | 4/2002 | Morrison |
| 2002/0046099 A1 | 4/2002 | Frengut et al. |
| 2002/0049633 A1 | 4/2002 | Pasquali |
| 2002/0052785 A1 | 5/2002 | Tenenbaum |
| 2002/0052925 A1 | 5/2002 | Kim et al. |
| 2002/0053078 A1 | 5/2002 | Holtz et al. |
| 2002/0054089 A1 | 5/2002 | Nicholas |
| 2002/0055912 A1 | 5/2002 | Buck |
| 2002/0057285 A1 | 5/2002 | Nicholas, III |
| 2002/0059094 A1 | 5/2002 | Hosea et al. |
| 2002/0059099 A1 | 5/2002 | Coletta |
| 2002/0065802 A1 | 5/2002 | Uchiyama |
| 2002/0068500 A1 | 6/2002 | Gabai et al. |
| 2002/0069105 A1 | 6/2002 | do Rosario Botelho et al. |
| 2002/0073079 A1 | 6/2002 | Terheggen |
| 2002/0077219 A1 | 6/2002 | Cohen et al. |
| 2002/0078076 A1 | 6/2002 | Evans |
| 2002/0078192 A1 | 6/2002 | Kopsell et al. |
| 2002/0087499 A1 | 7/2002 | Stockfisch |
| 2002/0087621 A1 | 7/2002 | Hendriks |
| 2002/0091700 A1 | 7/2002 | Steele et al. |
| 2002/0091875 A1 | 7/2002 | Fujiwara et al. |
| 2002/0094868 A1 | 7/2002 | Tuck et al. |
| 2002/0099605 A1 | 7/2002 | Weitzman et al. |
| 2002/0099767 A1 | 7/2002 | Cohen et al. |
| 2002/0099812 A1 | 7/2002 | Davis et al. |
| 2002/0099824 A1 | 7/2002 | Bender et al. |
| 2002/0103811 A1 | 8/2002 | Fankhauser et al. |
| 2002/0107847 A1 | 8/2002 | Johnson |
| 2002/0107858 A1 | 8/2002 | Lundahl et al. |
| 2002/0111910 A1 | 8/2002 | Walsh |
| 2002/0111994 A1 | 8/2002 | Raghunandan |
| 2002/0112035 A1* | 8/2002 | Carey et al. ............... 709/219 |
| 2002/0112048 A1 | 8/2002 | Gruyer et al. |
| 2002/0116494 A1 | 8/2002 | Kocol |
| 2002/0120648 A1 | 8/2002 | Ball et al. |
| 2002/0122065 A1 | 9/2002 | Segal et al. |
| 2002/0123912 A1 | 9/2002 | Subramanian et al. |
| 2002/0128904 A1 | 9/2002 | Carruthers et al. |
| 2002/0128908 A1 | 9/2002 | Levin et al. |
| 2002/0128925 A1 | 9/2002 | Angeles |
| 2002/0152121 A1 | 10/2002 | Hiroshi |
| 2002/0152126 A1 | 10/2002 | Lieu et al. |
| 2002/0152222 A1 | 10/2002 | Holbrook |
| 2002/0154163 A1 | 10/2002 | Melchner |
| 2002/0156781 A1 | 10/2002 | Cordray et al. |
| 2002/0156812 A1 | 10/2002 | Krasnoiarov et al. |
| 2002/0156881 A1* | 10/2002 | Klopp et al. .............. 709/224 |
| 2002/0161673 A1* | 10/2002 | Lee et al. ................... 705/27 |
| 2002/0169670 A1 | 11/2002 | Barsade et al. |
| 2002/0169762 A1 | 11/2002 | Cardona |
| 2002/0170068 A1 | 11/2002 | Rafey et al. |
| 2002/0171682 A1 | 11/2002 | Frank et al. |
| 2002/0175947 A1 | 11/2002 | Conrad et al. |
| 2002/0194151 A1 | 12/2002 | Fenton et al. |
| 2002/0198778 A1 | 12/2002 | Landsman et al. |
| 2002/0198939 A1* | 12/2002 | Lee et al. ................... 709/203 |
| 2003/0004804 A1 | 1/2003 | Landsman et al. |
| 2003/0005000 A1 | 1/2003 | Landsman et al. |
| 2003/0005067 A1 | 1/2003 | Martin et al. |
| 2003/0005134 A1 | 1/2003 | Martin et al. |
| 2003/0009497 A1* | 1/2003 | Yu ............................. 707/513 |
| 2003/0011639 A1 | 1/2003 | Webb |
| 2003/0014304 A1 | 1/2003 | Calvert et al. |
| 2003/0014399 A1 | 1/2003 | Hansen et al. |
| 2003/0018778 A1* | 1/2003 | Martin et al. .............. 709/224 |
| 2003/0018885 A1 | 1/2003 | Landsman et al. |
| 2003/0023481 A1 | 1/2003 | Calvert et al. |
| 2003/0023488 A1 | 1/2003 | Landsman et al. |
| 2003/0023698 A1 | 1/2003 | Dieberger et al. |
| 2003/0023712 A1* | 1/2003 | Zhao et al. ................. 709/223 |
| 2003/0028529 A1 | 2/2003 | Cheung et al. |
| 2003/0028565 A1 | 2/2003 | Landsman et al. |
| 2003/0028870 A1 | 2/2003 | Weisman et al. |
| 2003/0032409 A1 | 2/2003 | Hutcheson et al. |
| 2003/0033155 A1 | 2/2003 | Peerson et al. |
| 2003/0040958 A1 | 2/2003 | Fernandes |
| 2003/0041050 A1 | 2/2003 | Smith et al. |
| 2003/0046150 A1 | 3/2003 | Ader et al. |
| 2003/0050863 A1* | 3/2003 | Radwin .......................... 705/27 |
| 2003/0052913 A1 | 3/2003 | Barile |
| 2003/0074448 A1 | 4/2003 | Kinebuchi |
| 2003/0088554 A1 | 5/2003 | Ryan et al. |
| 2003/0101242 A1 | 5/2003 | Cowden et al. |
| 2003/0105589 A1 | 6/2003 | Liu et al. |
| 2003/0110080 A1 | 6/2003 | Tsutani et al. |
| 2003/0115157 A1 | 6/2003 | Circenis |
| 2003/0120593 A1 | 6/2003 | Bansal et al. |
| 2003/0120654 A1 | 6/2003 | Edlund et al. |
| 2003/0130910 A1* | 7/2003 | Pickover et al. ............... 705/27 |
| 2003/0131100 A1 | 7/2003 | Godon et al. |
| 2003/0135490 A1 | 7/2003 | Barrett et al. |
| 2003/0135853 A1 | 7/2003 | Goldman et al. |
| 2003/0154168 A1 | 8/2003 | Lautenbacher |
| 2003/0171990 A1 | 9/2003 | Rao et al. |
| 2003/0172075 A1 | 9/2003 | Reisman |
| 2003/0176931 A1 | 9/2003 | Pednault et al. |
| 2003/0182184 A1 | 9/2003 | Strasnick et al. |
| 2003/0195837 A1 | 10/2003 | Kostic et al. |
| 2003/0195877 A1 | 10/2003 | Ford et al. |
| 2003/0206720 A1 | 11/2003 | Abecassis |
| 2003/0208472 A1 | 11/2003 | Pham |
| 2003/0220091 A1 | 11/2003 | Farrand et al. |
| 2003/0221167 A1 | 11/2003 | Goldstein et al. |
| 2003/0229542 A1 | 12/2003 | Morrisroe |
| 2004/0002896 A1 | 1/2004 | Alanen et al. |
| 2004/0024756 A1 | 2/2004 | Rickard |
| 2004/0030798 A1 | 2/2004 | Andersson et al. |
| 2004/0044677 A1 | 3/2004 | Huper-Graff et al. |
| 2004/0068486 A1 | 4/2004 | Chidlovskii |
| 2004/0073485 A1 | 4/2004 | Liu et al. |
| 2004/0078294 A1 | 4/2004 | Rollins et al. |
| 2004/0095376 A1 | 5/2004 | Graham et al. |
| 2004/0098229 A1 | 5/2004 | Error et al. |
| 2004/0098449 A1 | 5/2004 | Bar-Lavi et al. |
| 2004/0117353 A1 | 6/2004 | Ishag |
| 2004/0122943 A1* | 6/2004 | Error et al. .................. 709/224 |
| 2004/0133845 A1 | 7/2004 | Forstall et al. |
| 2004/0162738 A1 | 8/2004 | Sanders et al. |
| 2004/0162759 A1 | 8/2004 | Willis |
| 2004/0163101 A1 | 8/2004 | Swix et al. |
| 2004/0167926 A1 | 8/2004 | Waxman et al. |
| 2004/0167928 A1 | 8/2004 | Anderson et al. |
| 2004/0181525 A1 | 9/2004 | Itzhak et al. |
| 2004/0181604 A1 | 9/2004 | Immonen |
| 2004/0193488 A1 | 9/2004 | Khoo et al. |
| 2004/0210533 A1 | 10/2004 | Picker et al. |
| 2004/0225716 A1 | 11/2004 | Shamir et al. |
| 2004/0247748 A1* | 12/2004 | Bronkema ..................... 426/106 |
| 2004/0249709 A1 | 12/2004 | Donovan et al. |
| 2004/0249938 A1 | 12/2004 | Bunch |
| 2004/0254810 A1 | 12/2004 | Yamaga et al. |
| 2004/0254844 A1* | 12/2004 | Torres ............................. 705/26 |
| 2004/0267723 A1 | 12/2004 | Bharat |
| 2005/0015366 A1 | 1/2005 | Carrasco et al. |
| 2005/0021397 A1 | 1/2005 | Cui et al. |
| 2005/0027821 A1 | 2/2005 | Alexander et al. |
| 2005/0027822 A1 | 2/2005 | Plaza |
| 2005/0033657 A1 | 2/2005 | Herrington et al. |
| 2005/0038819 A1 | 2/2005 | Hicken et al. |
| 2005/0080772 A1 | 4/2005 | Bem |
| 2005/0086109 A1 | 4/2005 | McFadden et al. |
| 2005/0091106 A1 | 4/2005 | Reller et al. |
| 2005/0091111 A1 | 4/2005 | Green et al. |
| 2005/0097088 A1 | 5/2005 | Bennett et al. |
| 2005/0102202 A1 | 5/2005 | Linden et al. |
| 2005/0102282 A1 | 5/2005 | Linden |
| 2005/0125382 A1 | 6/2005 | Karnawat et al. |
| 2005/0131762 A1 | 6/2005 | Bharat et al. |
| 2005/0132267 A1 | 6/2005 | Aviv |
| 2005/0149404 A1 | 7/2005 | Barnett et al. |
| 2005/0155031 A1 | 7/2005 | Wang et al. |
| 2005/0182773 A1* | 8/2005 | Feinsmith ..................... 707/100 |

(56) References Cited

U.S. PATENT DOCUMENTS

| | | | |
|---|---|---|---|
| 2005/0187823 A1 | 8/2005 | Howes | |
| 2005/0188423 A1* | 8/2005 | Motsinger et al. | 726/22 |
| 2005/0203796 A1 | 9/2005 | Anand et al. | |
| 2005/0204148 A1 | 9/2005 | Mayo | |
| 2005/0216572 A1 | 9/2005 | Tso et al. | |
| 2005/0222901 A1 | 10/2005 | Agarwal et al. | |
| 2005/0222982 A1 | 10/2005 | Paczkowski et al. | |
| 2005/0240599 A1 | 10/2005 | Sears | |
| 2005/0273463 A1* | 12/2005 | Zohar et al. | 707/7 |
| 2005/0289120 A9 | 12/2005 | Soulanille et al. | |
| 2006/0015390 A1 | 1/2006 | Rijsinghani et al. | |
| 2006/0026233 A1 | 2/2006 | Tenembaum et al. | |
| 2006/0031253 A1 | 2/2006 | Newbold et al. | |
| 2006/0053230 A1 | 3/2006 | Montero | |
| 2006/0136524 A1 | 6/2006 | Wohlers et al. | |
| 2006/0136528 A1 | 6/2006 | Martin et al. | |
| 2006/0136728 A1 | 6/2006 | Gentry et al. | |
| 2006/0235965 A1 | 10/2006 | Bennett et al. | |
| 2006/0253432 A1 | 11/2006 | Eagle et al. | |
| 2007/0016469 A1 | 1/2007 | Bae et al. | |
| 2007/0038956 A1 | 2/2007 | Morris | |

FOREIGN PATENT DOCUMENTS

| | | | |
|---|---|---|---|
| EP | 1045547 | 10/2000 | |
| EP | 1154611 | 11/2001 | |
| EP | 1207468 | 5/2002 | |
| JP | 343825 | 2/1991 | |
| JP | 11066099 | 3/1999 | |
| JP | 2001084256 | 3/2001 | |
| JP | 2001147894 | 5/2001 | |
| JP | 20010222535 | 8/2001 | |
| JP | 2001312482 | 11/2001 | |
| JP | 2002024221 | 1/2002 | |
| JP | 2002032401 | 1/2002 | |
| JP | 2002073545 | 3/2002 | |
| JP | 2002259371 | 9/2002 | |
| JP | 2002334104 | 11/2002 | |
| JP | 2003058572 | 2/2003 | |
| JP | 2003141155 | 5/2003 | |
| JP | 2003178092 | 6/2003 | |
| JP | 20030271647 | 9/2003 | |
| JP | 2004-355376 | 12/2004 | |
| WO | WO 9847090 | 10/1998 | |
| WO | WO 99/38321 | 7/1999 | |
| WO | WO 99/44159 | 9/1999 | |
| WO | WO 99/46701 | 9/1999 | |
| WO | WO 99/55066 | 10/1999 | |
| WO | WO 99/59097 | 11/1999 | |
| WO | WO 00/04434 | 1/2000 | |
| WO | WO 00/54201 | 9/2000 | |
| WO | WO 01/03028 | 1/2001 | |
| WO | WO 01/15052 | 3/2001 | |
| WO | WO 01/39024 A2 | 5/2001 | |
| WO | WO 01/44992 | 6/2001 | |
| WO | WO 01/63472 | 8/2001 | |
| WO | WO 01/69929 | 9/2001 | |
| WO | WO 01/90917 | 11/2001 | |
| WO | WO 02/44869 A2 | 6/2002 | |
| WO | WO 03/010685 | 2/2003 | |
| WO | WO 03/010685 A1 * | 2/2003 | G06F 17/30 |

OTHER PUBLICATIONS

Montgomery, Alan, et al., "Learning About Customers Without Asking", Carnegie Mellon University, Tepper School of Business, Pittsburgh, PA, 35 pages.*

"Shopping cart software", Wikipedia, Downloaded from: en.wikipedia.org/wiki/Shopping_cart_software on Mar. 14, 2012, pp. 1-3.*

"HTTP cookie", Wikipedia, Downloaded from: en.wikipedia.org/wiki/Browser_cookie on Mar. 14, 2012, pp. 1-18.*

Bucklin, Randolph E., et al., "Choice and the Internet: From Clickstream to Research Stream", Marketing Letters, vol. 13, No. 3, Kluwer Academic Publishers, The Netherlands, © 2002, pp. 245-258.*

Fenstermacher, Kurt D., et al., "Mining Client-Side Activity for Personalization", WECWIS 2002, Newport Beach, CA, Jun. 26-28, 2002, pp. 205-212.*

Cooley, R., et al., "Web Mining: Information and Pattern Discovery on the World Wide Web", TAI 1997, Newport Beach, CA, Nov. 3-8, 1997, pp. 558-567.*

Fenstermacher, Kurt D., et al., "Client-Side Monitoring for Web Mining", Journal of the American Society for Information Science and Technology, vol. 54, No. 7, Wiley Periodicals, Inc., © 2003, pp. 625-637.*

Nelte, Michael, et al., "Cookies: Weaving the Web into a State", Crossroads —The ACM Student Magazine, vol. 7, Issue 1, Sep. 2000, pp. 1-8.*

Montgomery, Alan, et al., "Learning About Customers Without Asking", Carnegie Mellon University, Tepper School of Business, Pittsburgh, PA, 2002, pp. 1-33.*

ACM Portal USPTO Search, "Communications of the ACM: vol. 52, Issue 1", Association for Computing Machinery, dated Jan. 2009, 1 page.

Aggarwal, Charu C. et al. 2001. Intelligent Crawling on the World Wide Web with Arbitrary Predicates. ACM, pp. 96-105.

BackWeb Technologies Ltd., BackWEB User's Guide, 1997, [48 pgs.].

Bae, Sung Min, et al., "Fizzy Web Ad Selector", IEEE Intelligent Systems, vol. 18 Issue 6, Nov./Dec. 2003, pp. 62-69.

Broder, Alan J., "Data Mining the Internet and Privacy", WEBKDD '99, LNAI 1836, Springer-Verlag, Berlin, Germany, (c) 2000, pp. 56-73.

Bucklin, Randolph E., et al., "Choice and the Internet: From Clickstream to Research Stream", Marketing Letters, vol. 13, No. 3, Aug. 2002, pp. 245-258.

Claypool, et al., Inferring User Interest, Worcester Polytechnic Inst., IEEE Internet Computing, Nov.-Dec. 2001, pp. 32-39 [8 pgs.].

comScore Marketing Solutions and Media Metrix (9 sheets), webpage) [online], 2003 comScore Networks, Inc. (retrieved on Oct. 8, 2003), retrieved from the internet: <URL:http://vAvw.comscore.com>.

Copernic, Copernic: Software to Search, Find, and Manage Information, Copernic Technologies, Inc. 2004, 2 pgs. (retrieved on Apr. 6, 2004). Retrieved from the Internet:<URL:http://www.copernic.com/en/index.html>.

Diligenti, Michelangelo et al. 2004. A Unified Probalistic Framework for Web Page Scoring Systems. IEEE, vol. 16, No. 1. Jan. 2004, pp. 4-16.

Dogpile, Dogpile Web Search Home Page, InfoSpace, Inc. 2004, p. 1 of 1, (retrieved on Apr. 1, 2004). Retrieved from the Internet: <URL:http://www.dogpile.com.html>.

Eick, Stephen G., "Visual Analysis of Website Browsing Patterns", Visual Interfaces to Digital Libraries, Springer-Verlag, Berlin, Germany, (c) 2002, pp. 65-77.

Eirinaki, Magdalini, et al., "Web Mining for Web Personalization", ACM Transactions on Internet Technology (TOIT), vol. 3, Issue 1, Feb. 2003, pp. 1-27.

EPO Communication in European Appln. No. 02778589, completed Dec. 21, 2005 (2 Sheets).

EPO Communication in European Appln. No. 04795209, mailed Feb. 17, 2011 [160 pages].

EPO Communication in European Appln. No. 04795209, mailed. Feb. 17, 2011 [4 pages].

EPO File History of EP 2004795209, downloaded from European Patent Office on Apr. 13, 2011 [164 pgs.].

EPO, Communication for EP 03 75 5344, Feb. 14, 2011 [4 pgs.].

EPO, File history of EP—03755344.3, Method and Apparatus for Displaying Messages in Computer Systems, as of Feb. 21, 2011 [121 pgs.].

EPO, File history of EP 2004794999, downloaded from EPO Apr. 13, 2011 [204 pgs.].

EPO, File history of EP1714221 (downloaded from EPO on Apr. 13, 2011) [139 pages].

(56) References Cited

OTHER PUBLICATIONS

EPO, Supplementary European Search Report for EP 03 75 5344, Jun. 30, 2009, mailed Jul. 10, 2009 [2 pgs.].
Favela, Jesus et al. 1997. Image-Retrieval Agent: Integrating Image Content and Text. IEE, vol. 1.14, pp. 36-39.
Fenstermacher, Kurt D., et al., "Client-Side Monitoring for Web Mining", Journal of the American Society for Information Science and Technology, vol. 54, Issue 7, May 2003, pp. 625-637.
Fenstermacher, Kurt D., et al., "Mining Client-Side Activity for Personalization", WECWIS 2002, (c) 2002, pp. 205-212.
Friedman, Batya, et al., "Informed Consent in the Mozilla Browser: Implementing Value-Sensitive Design", HICSS-35 '02, Jan. 2002, pp. 10-19.
Fu, Xiaobin, et al., "Mining Navigation History for Recommendation", IUI 2000, New Orleans, LA, (c) 2000, pp. 106-112.
Google Search, "Result Search Query Build Search Engine Index Using Gather Consumer Navigate Search", http://scholar.google.com/scholar, dated Apr. 7, 2010, 3 pages.
Gralla, Preston, How the Internet Works, Special Edition, Ziff-Davis Press, Emeryville, CA, .(c) 1997, pp. 254 and 266-271.
Greening, Dan R., "Tracking Users: What Marketers Really Want to Know", Web Techniques, Jul. 1999, downloaded from: www.webtechniques.com/archives/1999/07/, pp. 1-9.
Hancock, Wayland, "A new way to get information from the Internet," American Agent & Broker, Nov. 1997, 69, 11, pp. 65-66 [2 pgs.].
Heinle et al. 1997. Designing with JavaScript: Creating Dynamic Web Pages.Sep. 1997, pp. 1-33, 46, 83 [Cited by EPO as "A" reference for EP 02 77 8589 in Supplementary European Search Report dated Dec. 21, 2005].
Hun, Ke et al. 2003. A Probabilistic Model for Intelligent Web Crawlers. IEEE, pp. 278-282.
Japanese Patent Office, Official Action issued Dec. 17, 2010, mailed Dec. 27, 2010 in Japanese Patent Application No. 2007-528053 (non-official translation), 7 pgs.
Keys. 1998. Every Possible Internet Advertisement Drastic Increase of Click Through Rate by Interactivity and Multimedia. Nikkei Internet Technology. Dec. 22, 1998. Jan. Issue (1999), vol. 18, pp. 118-127.
Kiyomitsu, Hidenari, et al., "Web Reconfiguration by Spatio-Temporal Page Personalization Rules Based on Access Histories", Applications and the Internet, San Diego, CA, Jan. 8-12, 2001, pp. 75-82.
Klemm, Reinhard P., "WebCompanion: A Friendly Client-Side Web Prefetching Agent", IEEE Transactions on Knowledge and Data Engineering, vol. 11, No. 4, Jul./Aug. 1999, pp. 577-594.
Kurohashi, Sadao, et al. 1997. The Method for Detecting Important Descriptions of a Word Based on its Density Distribution in Text. Information Processing Society of Japan. vol. 38, Issue No. 4 (Apr. 15, 1997), pp. 845-854.
Lee, Ching-Cheng, et al., "Category-Based Web Personalization System", COMPSAC 2001, Oct. 8-12, 2001, pp. 621-625.
Leuski, Anton et al. 2000. Lighthouse: Showing the Way to Relevant Information. IEEE, Oct. 2000, pp. 125-129.
Liu, Jian-Guo, et al., "Web Mining for Electronic Business Application", PDCAT 2003, Aug. 27-29, 2003, pp. 872-876.
Liu, Jian-Guo, et al., "Web Usage Mining for Electronic Business Applications", Machine Learning and Cybernetics, Shanghai, China, Aug. 2004, pp. 1314-1318.
Lu, Hongjun, et al., "Extending a Web Browser with Client-Side Mining", APWeb 2003, LNCS 2642, Springer-Verlag, Berlin, Germany, (c) 2003, pp. 166-177.
Luxenburger, Julia, et al., "Query-Log Based Authority Analysis for Web Information Search", Wise 2004, LNCS 3306, Springer-Verlag, Berlin, Germany, Nov. 1, 2004, pp. 90-101.
Metacrawler, Web Search Home Page—MetaCrawler, InfoSpace, Inc. 2004, p. 1 of 1 (retrieved on Apr. 6, 2004), Retrieved from the internet: <URL:http://www.metacrawler.com.html>.
Mitchell, T., "Decision Tree Learning Based on Machine Learning" (Apr. 5, 2003), lecture slides for textbook Machine Learning, McGraw Hill, 1997, pp. 46-74 [29 pgs.].
Mobasher, Bamshad, et al., "Automatic Personalization Based on Web Usage Mining", Communications of the ACM, vol. 43, Issue 8, Aug. 2000, pp. 142-151.
Montgomery, Alan et al., Learning About Customers Without Asking, Carnegie Mellon University, Tepper School of Business, Jan. 2002 [35 pgs.].
NETSCAPE Communications Corp., Netcaster Developer's Guide, Netscape Communicator, Sep. 25, 1997 [112 pgs.].
NielsenllNetRatings (24 sheets), webpage [online], 2003 NetRatings, Inc. (retrieved on Oct. 8, 2003), retrieved from the internet: <URL:http://www.nielsen-netratings.com>.
Nilsson, B. A., and Robb, J., "Invasion of the Webcasters," PC World, vol. 15, No. 9 (Sep. 1997) p. 204-216 [9 pgs.].
Otsuka, Shingo, et al. 2004. The Analysis of Users Behavior Using Global Web Access Logs. IPSJ SIG Technical Report, vol. 2004 No. 71 (Jul. 13, 2004), pp. 17-24.
Paepcke, Andreas, et al., "Beyond Document Similarity: Understanding Value-Based Search and Browsing Technologies", ACM SIGMOD Record, vol. 29, Issue 1, Mar. 2000, pp. 80-92.
Paganelli, Laila, et al., "Intelligent Analysis of User Interactions with Web Applications", IUI '02, San Francisco, CA, Jan. 13-16, 2002, pp. 111-118.
Park, Joon S., et al., "Secure Cookies on the Web", IEEE Internet Computing, vol. 4, Issue 4, Jul./Aug. 2000, pp. 36-44.
Payton, D., et al. 1999. Dynamic collaborator discovery in information intensive environments. ACM Comput. Surv. 31, 2es, Article 8 (Jun. 1999), pp. 1-8.
PCT International Search Report for PCT/US03/13985 mailed Aug. 8, 2003; total of 1 sheet.
Pierrakos, Dimitrios, et al., "Web Usage Mining as a Tool for Personalization: A Survey", User Modeling and User-Adapted Interaction, vol. 13, No. 4, (c) 2003, pp. 311-372.
Schonberg, Edith, et al., "Measuring Success", Communications of the ACM, vol. 43, Issue 8, Aug. 2000, pp. 53-57.
Shahabi, Cyrus, et al., "Efficient and Anonymous Web-Usage Mining for Web Personalization", INFORMS Journal on Computing, vol. 15, No. 2, Spring 2003, pp. 123-148.
Soumen Chakrabarti et al., "Focused Crawling: A New Approach to Top-Specific Web Resource Discovery" Computer Networks 31 (1999), pp. 1623-1640.
Srivastava, Jaideep, et al., "Web Usage Mining: Discovery and Applications of Usage Patterns from Web Data", SIGKDD Explorations, vol. 1. Issue 2, Jan. 2000, pp. 12-23.
Takahashi. 2001. JavaScript Lab: Safe Control of Pop-up Windows. Web Designing. Mainichi Communications, Inc. Jun. 10, 2001. No. 9, vol. 12, pp. 86-89 (separate volume of Mac Fan of Jun. 10 issue).
U.K. Intellectual Property Office, Examination Report in Great Britain application, GB0724938.6, dated Jan. 11, 2010, 2 pages.
U.K. Intellectual Property Office, Official Action mailed Jul. 16, 2010 for British Application No. GB0724938.6, filed Jun. 28, 2008 [1 pg.].
Uehara, Satoru, et al., "An Implementation of Electronic Shopping Cart on the Web System Using component-Object Technology", Proc. of the 6th International Conf./ on Object-Oriented Real-Time Dependable Systems, Jan. 8-10, 2001, pp. 77-84.
Wenyin, Liu, et al., "Ubiquitous Media Agents: A Framework for Managing Personally Accumulated Multimedia Files", Multimedia Systems, vol. 9, No. 2, Aug. 2003, pp. 144-156.
WIPO, International Preliminary Report on Patentability (Chap. I of PCT) for PCT/US04/33777, Jan. 23, 2006 [4 pgs].
WIPO, International Preliminary Report on Patentability (Chap. I of PCT) for PCT/US05/01022, Aug. 14, 2006 [6 pgs].
WIPO, International Search Report for PCT/US04/33777, Jan. 19, 2006 [3 pgs.].
WIPO, International Search Report for PCT/US05/01022, Apr. 24, 2006 [3 pgs.].
WIPO, Written Opinion of the International Searching Authority for PCT/US04/33777, Jan. 23, 2006 [3 pgs].
WIPO, Written Opinion of the International Searching Authority for PCT/US05/01022, Apr. 26, 2006 [5 pgs].

(56) References Cited

OTHER PUBLICATIONS

Xu, Cheng-Zhong, et al., "A Keyword-Based Semantic Prefetching Approach in Internet News Services", IEEE Transactions on Knowledge and Data Engineering, vol. 16, Issue 5, May 2004, pp. 601-611.
Yuichi Yagawa et al. TV Program Planning Agent using Analysis Method of User's Taste; IEICE Technical Report vol. 98, No. 437: The Institute of Electronics, Information and Communication Engineers; Dec. 1, 1998, vol. 98, No. 437, pp. 9-16.
Zaiane, Osmar R., et al., "Discovering Web Access Patterns and Trends by Applying OLAP and Data Mining Technology on Web Logs", IEEE International Forum on Research and Technology Advances in Digital Libraries, Santa Barbara; CA, Apr. 22-24, 1998, pp. 19-29.
Advisory Action dated Nov. 19, 2008 issued in U.S. Appl. No. 11/015,583, 3 pages.
Final Office Action dated Mar. 26, 2010 issued in U.S. Appl. No. 11/207,590, 8 pages.
Final Rejection dated May 21, 2008 issued in U.S. Appl. No. 11/015,583, 8 pages.
International Preliminary Report on Patentability in PCT Appln. No. PCT/US2004/07714, dated Oct. 1, 2005 [4 pages].
International Search Report in PCT Appln. No. PCT/US2004/07714, mailed Mar. 31, 2005 [1 page].
Langheinrich, M., et al. "Unintrusive Customization Techniques for Web Advertising," NEC Corporation, C&C Media Research Laboratories, Kanagawa, Japan, Computer Networks, vol. 31, No. 11, pp. 1259-1272, May, 1999 (in Conf. Proc. 8th Int'l WWW Conf., Toronto, Canada, May 11-14, 1999).
Non-Final Rejection dated Dec. 20, 2009 issued in U.S. Appl. No. 11/015,583, 8 pages.
Non-Final Rejection dated Jul. 20, 2009 issued in U.S. Appl. No. 11/015,583, 7 pages.
Pierre Maret, et al.; Multimedia Information Interchange: Web Forms Meet Data Servers; Proceedings of the IEEE International Conference on Multimedia Computing and Systems; vol. 2, Jun. 7-11, 1999, pp. 499-505; XP000964627; Florence, Italy.
Ready, Kevin et al., "Plug-n-Play Java Script" (Indianapolis, IN: New Riders Publishing, 1996): 19-22, 39, 40 and 43-45.
Restriction Requirement dated Oct. 31, 2007 issued in U.S. Appl. No. 11/015,583, 6 pages.
Written Opinion in PCT Appln. No. PCT/US2004/07714, mailed Mar. 31, 2005 [3 pages].
European Search Report for Application No. EP 06 01 3103, 2 pages, Feb. 2, 2010.
CodeBrain.com Java at its Best: Javascript index Windows and Frames, http://www.codelifter.com/main/javascript/index_windowframes.html, 2 pages, accessed on Dec. 19, 2005.
Hongyu Liu et al., "Focused Crawling by Leaning HMM fom User's Topic-Specfc Bowsing" Poceedings of the IEEE/WIC/ACM International Conference on Web intelligence (WI '04), 4 pages, Sep. 20, 2004.
Internatonal Peliminar Report on Paentability and Witen Opinion in PCT Application No. PCT/US2005/035352, May 2, 2008.
Japanese Patent Office, Office Action mailed Jul. 26, 2010 from Japanese Serial No, JP2008-519504, filed Jun. 5, 2008.
International Search Report in EP Application No. 05802579.2-1527, dated May 2, 2008, 4 pages.
International Preliminary Report on Patentability and Written Opinion in PCT Application No. PCT/US2005/001022, dated Apr. 26, 2006, 6 pages.
"Ad Cose"Webpage[onlin] C/net Downloads.com [retrieved on Oct. 4, 2001] <URL http:/download.cnet.com/downloads/0-10059-100-915154.thml> 2 pages.
"Ad Muncher", Webpage [online]. C/net Downloads.com [retrieved on Oct. 4, 2001]. Retrieved from the Internet<URL: http//downloads/0-33567-18-100-2750044.html>, 2 pages.
"AdDelete", Webpage [oniine]. C/net Download.com [retrieved on Oct. 4, 2001]. Retrieved from the Internet <URL: http//download.cnet.com/downloads/0-10059100-7003126.html>, 2 pages.

"Adextinguisher—Introduction and News Section", Webpage [online][retrieved on Oct. 4, 2001]. Retrieved from the Internet URL:http//adext.magenet.net.html., 2 pages.
"AdPurger", Webpage [online]. C/net Downloads.com [retrieved on Oct. 4, 2001]. Retrieved from the Internet <URL: http//download.cnet.com/downloads/0-10068-100-5067717.html>, 2 pages.
"AdsOff", Webpage [online]. C/net Downloads.com [retrieved on Oct. 3, 2001]. Retrieved from the Internet<URL:http// download.cnet.com/downloads/0-10059-100-9 12651 html>,, 2 pages.
"AdSubstract SE", webpage [online], C/net Downloads.com [retrieved on Oct. 4, 2001], Retrieved from the internet<URL:http//download.cnet.com/downloads/0-3356727-100-5963713.html.>, 2 pages.
"Advertising Killer", webpage online, C/net Downloads.com, retrieved on Oct. 3, 2001, retrieved from the Internet<URL:http//download.cnet.com/downloads/0-10059-100-1539520.html>, 2 pages.
"AllGone", webpage online, C/net Downloads.corn, retrieved on Oct. 4, 2001, Retrieved from the Internet<URL:http//download.cnet.com/downloads/0-10068-100-2915974.html>, 2 pages.
"AnalogX Pow", webpage online., C/net Downloads.com, retrieved on Oct. 4, 2001, Retrieved from the Internet<URL:http//download.cnet com/downloads-0-3356748-10-915372.html., 2 pages.
"Banner Zapper", webpage onlilne, C/net Downloads.com, retrieved on Oct. 4, 2001, Retrieved from the Internet <URL:http//download.cnet.com/downloads/0-3356727-100-6384611.html>., 2 pages.
"BarrPopup", webpage online, C/net Downloads.com, retrieved on Oct. 4, 2001, retrieved from the Internet<URL:http//downloads.cnet.com/downloads/0-10059-100-6901908.html>, 2 pages.
"Black List", webpage online, C/net Downloads.com, retrieved on Oct. 4, 2001, retrieved from the Internet<URL:http//downloads.cnet.com/downloads/0-10059-100-902347html>, 2 pages.
"Close Pop 4.0", webpage online, Take Hike Software, retrieved on Oct. 4, 2001, URL:http//www.ryanware.com/close_popup.html>, 1 page.
"Claria-Company Information—Corporate Overview", retrieved on Mar. 3, 2005 retrieved from the Internet<URL:http//claria.com/companyinfo.html>.
"Close Popup", webpage online, C/net Downloads.corn, retrieved on Oct. 4, 2001, retrieved from the internet<URL: http//downloads.cnet.com/downloads/0-10059-100-905799.html>., 2 pages.
"CobraSoft PopStop", webpage online, C/net Downloads.com, retrieved on Oct. 4, 2001, retrieved from the internet<URL:http//downloads.cnet.com/downloads/0-10058-100-6926765.html>, 2 pages.
"Compare Prices and Read Reviews on AdsOff!", Epenions.com, webpage online, retrieved on Jan. 21, 2001, 3 pages.
"CrushPop 2000", webpage online, www.32bit.com, retrieved on Oct. 4, 2001, URL.http//32bit.com/software.com/ software/listings/Internet/Special180P/13794.htrnl., 2 pages.
Definition of "Close button", Microsoft Press Computer Dictionary, 3rd ed., Redmond WA: Microsoft Press, 1997, 2 pages.
"Directive 202/58/EC of the European Parliament and of the Council of Jul. 12, 2002 Concerning the Processing of Persorinal Data arid the Protection of Privacy in the Electronic Communications Sector (Directive on Privacy and Electronic Communications)", Official Journal L 201, Jul. 31, 2002, pp. 0037-0047.
"DoubleClick", webpage online, retrieved on Jun. 11, 2003, retrieved from the internet<URL:http//www.doubleclick.com>, 17 pages.
"Close button" Definition from online google search dated Mar. 2, 2007, 1 page.
"Target Gets Mod in Manhattan", by Laura Heiler, Aug. 20, 2001, pp. 2 & 37.
"InterMute" webpage online, retrieved on Oct. 3, 2001, retrieved from the Internet<URL:http://downloads.cnet.com/downloads/0-10059-100-906599,html>, 2 pages.
"Gator offers one-click shopping at over 5,000 e-commerce sites today"; Jun, 14; 1999; XP002145278; Date retrieved; Jun. 28, 2001., URL:http//www.gator.com/company/press/pr061499b.html., 1 page.

(56) References Cited

OTHER PUBLICATIONS

"Opening a Window", Kourbatov, A., Jul. 8, 2000., published by www.javascript.net, 2 pages.
Marcebra Net, webpage online, C/net Downloads.com, retrieved on Oct. 4, 2001, <URL:http//download.cent.com/downloads/0-3364666-100-5210875,html., 2 pages.
"Mr. KillAd", webpage online, C/net.Downloads,com, retrieved on Oct. 4, 2001, URL:http//download.cent.com/downloads/0-10059-100-895339.html>, 2 pages.
"Nagger", webpage online, C/net Downloads.com, retrieved on Oct. 4, 2001, URL:http//download.cnet.com/downloads/0-33567-46-100-2497932 html>, 2 pages.
"NoAds 2000.6.30,1", webpage oniine, South Bay oftware, retrieved Oct. 4, 2001, URL:http//www.southbaypc.com/NoAds.html, 2 pages.
"NoPops 1.1", webpage online, WebAttack.com, retrieved on Oct. 4, 2001, URL:http/www.webattach.com/get/noppers.html>, 1 page.
"Paraben's AdStopper", webpage online, C/net Downloads.com, retrieved on Oct, 4, 2001, URL:http//downloads.cnet.com/downloads/)-10059-100-2643648.html>, 2 pages.
International Search Report and Written Opinion from International Application No. PCT/US05/29615 mailed Mar. 9, 2006, 11 pages.
"Popki Popup Closer 1.4", webpage online, WebAttach.com, retrieved on Oct. 4, 2001, URL:http//www.webattack.com/get/popki.shtml.>, 1 page.
"PopKill", webpage online, C/net Downloads.com, retrieved on Oct. 4, 2001, URL:http//clownload.cent.com/downloads/0-10059-100-6967054.html>, 2 pages.
"PopNot" webpage online, C/net Downloads, retrieved on Oct. 4, 2001, URL:http//downloads/0-100-5112702.html>, 2 pages.
"Popup Hunter", webpage online, C/net Downloads.com, retrieved on Oct. 4, 2001, URL:http//download.cnet.com/downloads/o-10059-100-1451171.html>, 2 pages.
"PopUp Killer" webpage online, C/net Downloads.corn, retrieved on Oct. 3, 2001, URL:http//download.cnet.com/0-10059-100-7253644.html>, 2 pages.
"PopUp Smasher"webpage online, C/net Downloads.com, retrieved on Oct, 4, 2001, URL:http//download.cnet.com/0-3364664-100-7209048.html>, 2 pages.
"Pop-up Stopper", webpage online, C/net Downloads.com, retrieved on Oct, 3, 2001, URL:http//download.cnet.com/downloads/0/1059-100-6803957.sub--html&-gt, 2 pages.
"PopupDummy!", webpage online, C/net Downloads.com, retrieved on Oct. 4, 2001, URL:http//download.cnet.com/downloads/0-10059-100-6943327.html>, 2 pages.
The Privacy and Electronic Communications (EC Directive) Regulations 2003 (ECR), No. 2426, Electronic Communication, Sep. 2003, 22 pages.
U.S. Appl. No. 10/061,107 Office Action, mailed Nov. 2, 2005, 10 pages.
Ishitani, Lucila et al., "Masks: Bringing Anonymity and Personalization Together" IEEE Security & Privacy, vol. 1, issue 3, May/Jun. 2003, pp. 18-23.
IRTORG Internet Related Technologies Home Articles FAQs Games BBS Resources Software News Books Downloads About Beta Find, irt.org—JavaScript Windows FAQ Knowiedge Base, Jun. 3, 2006, 24 pages.
Katski, D,, "Web Magician" RocketDownLoad,corn, Http://www.rocketdownload.com/Details/Inte/Webmag.html, Oct. 4, 2004, 2 pages.
Zero Popup, http://download.cnet.com/downloads/0-3356748-100-7163307.html, Sep. 14, 2001 2 pages.
U.S. Appl. No. 11/427,226 Office Action, mailed Aug. 3, 2009, 10 pages.
U.S. Appl. No. 11/427,243 Office Action, mailed Feb. 4, 2010, 11 pages.
U.S. Appl. No. 11/427,226 Office Action, mailed Jun. 7, 2010, 25 pages.
U.S. Appl. No. 11/427,282 Office Action, mailed Aug. 10, 2009, 9 pages.
U.S. Appl. No. 11/207,590 Office Action, mailed Oct. 10, 2007, 13 pages.
U.S. Appl. No. 11/427,243 Office Action, mailed May 10, 2011, 24 pages.
U.S. Appl. No. 11/207,590 Office Action, mailed Mar. 26, 2010, 8 pages.
U.S. Appl. No. 11/207,590 Office Action, mailed Jun. 22, 2009, 8 pages.
U.S. Appl. No. 11/207,592 Office Action, mailed Jun. 24, 2008, 15 pages.
U.S. Appl. No. 10/700,820 Office Action, mailed May 24, 2007, 15 pages.
U.S. Appl. No. 10/700,820 Office Action, mailed Apr. 25, 2016, 7 pages.
U.S. Appl. No. 10/700,820 Office Action, mailed Dec. 26, 2006, 19 pages.
U.S. Appl. No. 11/207,592 Office Action, mailed Feb. 25, 2009, 7 pages.
U.S. Appl. No. 11/427,243 Office Action, mailed Jun. 25, 2009, 8 pages.
U.S. Appl. No. 10/061,107 Office Action, mailed Aug. 13, 2003, 5 pages.
U.S. Appl. No. 10/700,820 Office Action, mailed Sep. 13, 2006, 11 pages.
U.S. Appl. No. 10/061,107 Office Action, mailed Jan. 14, 2004, 10 pages.
U.S. Appl. No. 10/056,932 Office Action, mailed Sep. 16, 2004, 9 pages.
U.S. Appl. No. 10/056,932 Office Action, mailed Mar. 18, 2005, 8 pages.
U.S. Appl. No. 11/417,282 Office Action, mailed Apr. 27, 2010, 19 pages.
U.S. Appl. No. 10/056,932 Office Action, mailed Jul. 27, 2005, 7 pages.
U.S. Appl. No. 11/207,590 Office Action, mailed Oct. 27, 2010, 10 pages.
U.S. Appl. No. 11/207,592 Office Action, mailed Sep. 24, 2007, 13 pages.
U.S. Appl. No. 10/061,107 Office Action, mailed Sep. 28, 2010, 13 pages.
U.S. Appl. No. 10/056,932 Office Action, mailed Sep. 5, 2003, 6 pages.
U.S. Appl. No. 10/056,932 Office Action, mailed May 7, 2004.
U.S. Appl. No. 11/207,589 Office Action, mailed Oct. 19, 2007, 10 pages.
U.S. Appl. No. 10/061,107 Office Action, mailed May 5, 2006, 12 pages.
"Pug-n-Play Java Script", Kevin Ready, et al., New Riders Publishing, Indianapolis, IN, Oct. 1996, 11 pages.
"Surf in Peace 2.01"webpage online, WebAttack.com, retrieved on Oct. 4, 2001, URL:http//download.cnet.com/URL:http//www.webattach.com/get/sip.shtml>, 2 pages.
Non-Final Office Action mailed Oct. 16, 2007 from U.S. Appl. No. 11/210,209, 5 pages.
Non-Final Office Action mailed Jun. 23, 2006 from U.S. Appl. No. 11/211,197, 4 pages.
Final Office Action mailed May 10, 2011 from U.S. Appl. No. 11/427,243, 24 pages.
"Ultraseek Server Detailed Feature List", http://software.infoseek.com/products/ultraseek/ultrafeatures.htm., Accessed from Apr. 1998, archive from http:web.archive.org/web/19980419092128/https:;;software.infoseek.com/products/ 8 pages.
KIPO Office Action Dated Nov, 23, 2010, 8 pages.
International Search Report and Written Opinion from International Application No. PCT/US05/45722 mailed Jan. 19, 2007, 12 pages.
International Search Report and Written Opinion mailed from International Application No. PCT/US2006/025103 mailed Jan. 29, 2008, 6 pages.
International Search Report and Written Opinion from International Application No. PCT/US04/03377 mailed Jan. 19, 2006, 6 pages.
International Search Report and Written Opinion from International Application No. PCT/US05/01022 mailed Apr. 24, 2006, 8 pages.

(56) References Cited

OTHER PUBLICATIONS

International Search Report and Written Opinion from International Application PCT/US2005/029615 mailed Mar. 9, 2006.
International Search Report and Written Opinion from International Application PCT/US2005/35352 mailed Sep. 11, 2007, 8 pages.
Final Office Action mailed Mar. 25, 2011 from U.S. Appl. No. 11/420,191, 45 pages.
Final Office Action mailed Feb. 16, 2011 from U.S. Appl. No. 11/688,160, 15 pages.
International Preliminary Report on Patentability and Written Opinion from International Application No. PCT/US05/035352 mailed Sep. 11, 2007.
International Preliminary Report on Patentability from International Application No. PCT/US2005/029615 mailed Mar. 9, 2006, 7 pages.
International Preliminary Report on Patentability from International Application No. PCT/US2005/035352 mailed Sep. 11, 2007.
International Preliminary Report on Patentability from International Application No. PCT/US06/09954 mailed Aug. 30, 2006, 6 pages.
International Preliminary Report on Patentability from International Application No. PCT/US023386 mailed Jul 12, 2007, 7 pages.
International Preliminary Report on Patentability from International Application No. PCT/US06/025102 mailed Jul. 26, 2007, 4 pages.
International Preliminary Report on Patentability from International Application No. PCT/US06/025104 mailed Jan. 23. 2007, 5 pgs.
International Preliminary Report on Patentability from International Application No. PCT/US07/061944 mailed Feb, 14, 2008, 4 pgs.
International Preliminary Report on Patentability from International Application No. PCT/US06/008049 mailed Oct. 19, 4 pages.
International Preliminary Report on Patentability from International Application No. PCT/US06/008050 mailed Oct. 19, 2007, 4 pages.
International Preliminary Report on Patentability from International Application No. PCT/US06/025103 mailed Jan. 29, 2008, 4 pages.
International Preliminary Report on Patentability from International Application No. PCT/US06/009954 mailed Aug, 30, 2006, 6 pages.
Supplemental Notice of Allowability mailed Aug. 7, 2008 from U.S. Appl. No. 11/207,589, 4 pages.
Office Action from UK Application No. GB0724938.6 dated Feb, 16, 2011.
"Shopping with WhenUShop", webpage online, WhenU.com, retrieved Mar. 19, 2002, URL:http//www.whenu.com.
"SideStep, The Traveler's Search Engine"; webpage online, retrieved on Oct. 7, 2004, URL:http://www.sidestep.com/main.html.
Lindsay Smith, "A Tutorial on Principal Components Analysis", Feb, 26, 2002.
Visual Search ToolBar-Graphically Enhance Search Results, 2004, Viewpoint Corporation; webpage online, retrieved Oct, 7, 2004., URL:http://www.viewpoint.com/pub/toolbar/download.html.
PopUp Eraser, Webpage online, C/net Downloads.com, retrieved Oct 4, 2001, retrieved from the Internet at URL:http/ download.cnet.com/downloads/0-10059-100-5322841.html.

* cited by examiner

FIG. 5

| Version of crumb 602 | Time written 604 | Commercial Flag 606 | Keyword 608 | Character Set 610 |
|---|---|---|---|---|
| 3 | secs since 1970 hex. eg: 4166FAFC | 0 = no, 1 = yes, 2 = unknown (always 1) | 2005 Chevrolet Corvette | utf-8 |

FIG. 6

| CatID 802 | Day 702 | 0 | -1 | -2 | -3 |
|---|---|---|---|---|---|
| 10494 | Hit? 704 | 1 | 0 | 1 | 1 |

FIG. 7

| CategoryID 802 | Recency 804 | Frequency 806 | Banner Clicks 808 |
|---|---|---|---|
| 10494 | 3 | 4 | 1 |
| 98409 | 1 | 6 | 4 |
| 65625 | 14 | 6 | 3 |
| 68530 | 1 | 0 | 0 |
| 147374 | 12 | 0 | 0 |

| Comment 810 |
|---|
|  |
| Heavy and recent |
| Heavy last month |
| Light but recent |
| Light last month |

FIG. 8

| Bucket # | 0 | 1 | 2 | 3 | 4 | 5 | 6 | 7 |
|---|---|---|---|---|---|---|---|---|
| Time Slice | N/A | 0-5 min | 5-15 min | 15-30 min | 30-60 min | 1-2 hrs | 2-4 hrs | 4-12 hrs |
| Bucket # | 8 | 9 | 10 | 11 | 12 | 13 | 14 | 15 |
| Time Slice | 12-24 hrs | 1-3 days | 3-7 days | 7-14 days | 14-21 days | 21-30 days | 30-45 days | 45-60 days |

FIG. 9

| Bucket # | 0 | 1 | 2 | 3 | 4 | 5 | 6 | 7 |
|---|---|---|---|---|---|---|---|---|
| # Days w/ a visit | 0 | 1 | 2 | 3 | 4 or 5 | 6 to 10 | 11 to 30 | 31 to 60 |

FIG. 10

| CategoryID 1102 | Category leaf name 1104 | Revenue Priority 1106 |
|---|---|---|
| 9870 | Uncategorized | 0 |
| 10494 | Luxury Auto | 1 |
| 98409 | SUVs | 2 |
| 65625 | Payroll Software | 3 |
| 68530 | Florida except Orlando | 4 |

FIG. 11

METHOD AND DEVICE FOR PUBLISHING CROSS-NETWORK USER BEHAVIORAL DATA

CROSS REFERENCE TO RELATED APPLICATIONS

This application is a continuation of and seeks priority to U.S. nonprovisional application Ser. No. 11/226,066, entitled "Method and Device for Publishing Cross-Network User Behavioral Data," filed Sep. 14, 2005, published Jun. 22, 2006 as U.S. Publication No. 2006-0136528 A1, issued Apr. 6, 2010 as U.S. Pat. No. 7,693,863, which claims benefit of U.S. provisional patent application No. 60/637,684, filed Dec. 20, 2004, both of which are hereby incorporated by reference herein.

This application is related to commonly owned U.S. application Ser. No. 10/289,123, now U.S. Pat. No. 7,512,603, entitled "Responding to End-User Request for Information in a Computer Network" by inventors Eugene A. Veteska, David L. Goulden, and Anthony G. Martin, filed on Nov. 5, 2002, and issued on Mar. 31, 2009. The related application is also incorporated by reference.

BACKGROUND

The present invention relates to summarizing cross-network user behavioral data and further relates to restoring damaged data structures, either data structures summarizing cross-network user behavioral data or data structures remotely identifying to logic running on a user computer. The summarizing cross-network user behavioral data may particularly include publishing the data to one or more data structures that become accessible to a server hosting an authorized domain when a user accesses the authorized domain. The restoring of damaged data structures may particularly include automatically detecting deletion of or damaged to data structures and restoring the damaged data structures.

Advertising is most successful when it matches the viewer's desires. When the viewer uses a client computer to surf the web and visit websites hosted by servers, advertising can be targeted. One way to target users is to provide sponsored links in response to a search, using a search engine such as the engines provided by Google and Yahoo. Another way is to trigger advertising when a user visits a website, for instance using a so-called web beacon. Cookies can be used to identify a user that is searching or visiting a website and match the user to a server-side database that selects advertising to deliver. Server-side databases currently reflect information collected by servers connected to websites that users visit. Websites that are aggregated into a particular server-side database can be described as belonging to a user behavior collection network.

An opportunity arises to better target users, taking advantage of client software running on the client computer. Client-side software can monitor a user's web browsing activity, regardless of whether websites visited belong to a first or second user behavior collection network or no network at all. New technology can publish user behavior data during browsing and reduce or eliminate reliance on matching the user to the server-side database.

SUMMARY OF THE INVENTION

The present invention relates to summarizing cross-network user behavioral data. The summarizing cross-network user behavioral data may particularly include publishing the data to one or more data structures that become accessible to a server hosting an authorized domain when a user accesses the authorized domain. Particular aspects of the present invention are described in the claims, specification and drawings.

BRIEF DESCRIPTION OF THE DRAWINGS

FIG. 5 depicts a page in a familiar browser for a "Search+" web site.

FIG. 6 is an example of a cookie that stores the most recent commercial keyword of interest.

FIG. 7 is an example of summary data maintained by the behavior watcher that may be written to persistent memory.

FIG. 8 illustrates a bit string further summarized by category.

FIG. 9 illustrates buckets that may be applied to recency of using search words, clicking through, entering URL destinations or other indications of user interest.

FIG. 10 illustrates buckets that can be applied to user category involvement.

FIG. 11 illustrates how a category ID can be associated with both the category name and a revenue priority.

DETAILED DESCRIPTION OF EXEMPLARY EMBODIMENTS

The following detailed description is made with reference to the figures. Preferred embodiments are described to illustrate the present invention, not to limit its scope, which is defined by the claims. Those of ordinary skill in the art will recognize a variety of equivalent variations on the description that follows.

To illustrate an environment in which the present invention may be useful, we point to and incorporate by reference U.S. application Ser. No. 10/289,123, now U.S. Pat. No. 7,512,603, entitled "Responding to End-User Request for Information in a Computer Network" by inventors Eugene A. Veteska, David L. Goulden, and Anthony G. Martin, filed on Nov. 5, 2002, and issued on Mar. 11, 2009. Some of the discussion that immediately follows is borrowed from the prior application, which is commonly owned, but much is recast to a new paradigm of assembling user profile information client-side and publishing it using cookies.

Although embodiments of the present invention are described herein in the context of the Internet, the present invention is not so limited and may be used in other data processing applications.

Figure 1:
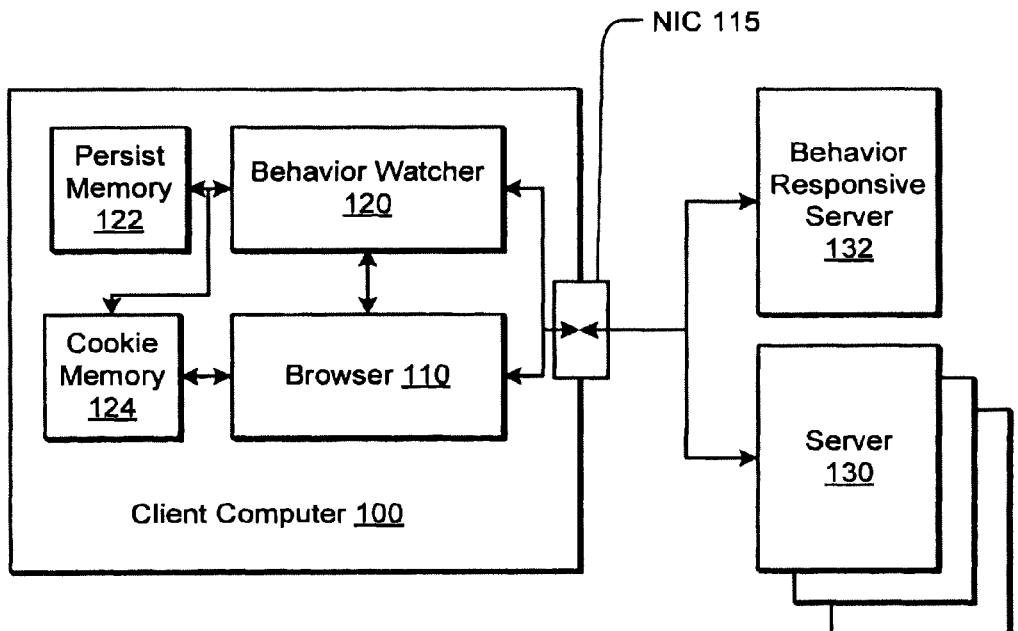
FIG. 1 is a schematic illustration of a client computer interacting with a server and a behavior responsive server.

FIG. 1 is a schematic illustration of a client computer 100 interacting with a server 130 and a behavior responsive server 132. In FIG. 1, an end-user on a client computer indicates their interest in a subject by submitting a search request to a search engine, typing a URL or clicking on a link or banner ad. Their interest becomes a request across on a network such as the Internet. A search engine may perform an Internet-wide search, or a search limited to a particular web site or domain name, or a search limited in some other way. The search request may be a query comprising one or more keywords, for example. The original search engine server 130 responds to the search request by sending a search result to the client computer 100. The search result may include a list of documents (e.g., web pages), links to documents, or other information relating to the keywords. A specific example of the just described scenario is an end-user typing the keyword "car" in a search engine and receiving back links to web sites that talk about car clubs, exotic cars, car racing, and like information.

A user submits a search request because of the user's interest in a topic. To make good use of the information about a user's interest, a behavior watching and/or behavior summarizing program 120 resident in the client computer listens for requests, for instance made using a browser 110 or other hyperlink enabled programs such as word processors or presentation programs. It listens for requests for information such as a search request, a click-through on a banner ad, or entry into the browser or click through of a destination URL. When the behavior watching program 120 detects that an end-user is performing a search or otherwise indicating their interest in a web site or subject, the behavior watching program records the interest. The interest may be recorded to program memory or to a persistent memory 122. When a user clicks on an advertisement related to the end-user's search request, the probability that the end-user will be interested in one or more related advertisements increases. In the car example, just above, the behavior watching program may note that the search was followed by certain click-throughs.

The behavior watcher 120 is resident in the client computer 100 so that it can respond to an end-user's search request even when the end-user uses different search engines. That is, unlike other targeting techniques that only work when an end-user is on a particular web site, the behavior watching program observes user interest across different search engines, web sites and even browsers. An end-user may obtain the behavior watching program by itself or along with free or reduced-cost computer programs, services, and other products.

The behavior responsive server 132 presents a new approach to providing content responsive to recent user behavior. User behavior has in the past been observed using a cookie with a unique user ID that allows server-side tracking. Server aggregated user behavior data is compiled among an organization of cooperating server owners. Cooperation may relate to ad serving (e.g., Double-Click), portals (e.g., Yahoo), search engines (e.g., Google) or other organizational basis. Cooperation in this sense is contractual more than technical. Server aggregated user behavior data is used, for instance, by an ad server when a web beacon (a small, null image with a URL pointing to an ad server) contacts the ad server and causes a unique user ID cookie to be transmitted. The ad server accesses a database, to update user behavior data with the new contact. The ad server could also access data from the server aggregated database, based on the unique user ID. A serious limitation of server aggregated user behavior data is that it is limited to contacts detected by cooperating servers when the user accesses cooperating web sites and the user's unique user ID cookie is transmitted. Mismatches of unique user IDs or multiple unique user IDs for the same user diminish the effectiveness of server-side aggregation. The combination of client-side user behavior tracking 120 and a reported-behavior responsive server 132 presents a new approach.

A reported-behavior responsive server 132 accepts one or more messages (e.g., cookies) that report recent user behavior as a basis for deciding among potential messages (e.g., banner ads) which message to give the user. The reported-behavior responsive server 132 need not access a server-side user behavior database to decide which message to send. Those of skill in the art will recognize that the new paradigm of reported behavior could be combined with server-side aggregation and that that combination also would be novel.

Figure 2:
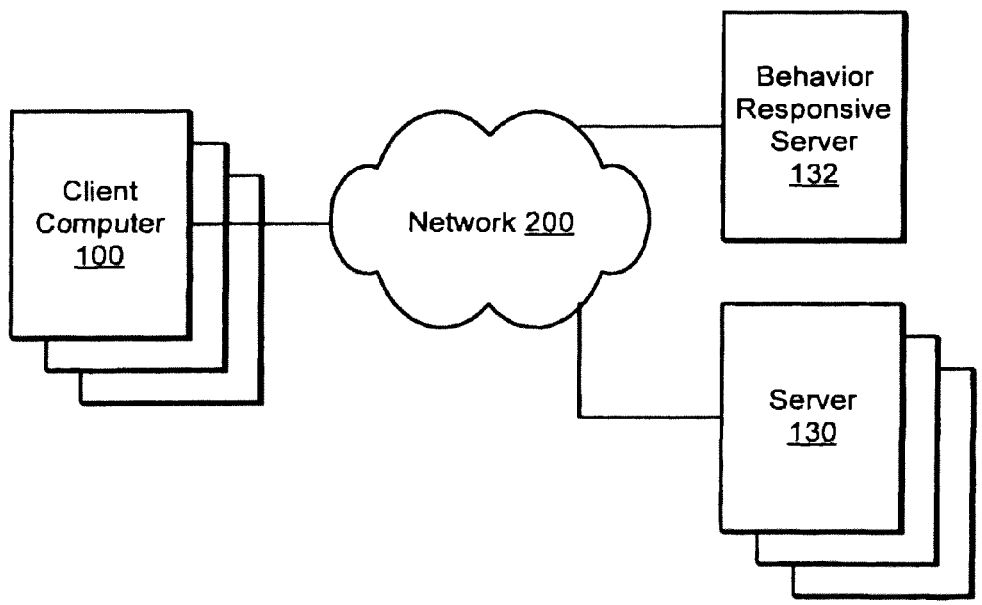
FIG. 2 illustrates a schematic diagram of a computer network.

FIG. 2 is shown a schematic diagram of a computer network. Network 200 may include one or more client computers 100, one or more web server computers 130, one or more behavior responsive server computers 132, and other computers not shown. Intermediate nodes such as gateways, routers, bridges, Internet service provider networks, public-switched telephone networks, proxy servers, firewalls, and other network components are not shown for clarity. In the example of FIG. 2, network 200 includes the Internet; however, other types of computer networks may also be used. Computers may be coupled to network 200 using any type of connection 115 without detracting from the merits of the present invention.

A client computer 100 is typically, but not necessarily, a personal computer such as those running the Microsoft Windows™, Apple Macintosh™, Linux, or UNIX operating systems. An end-user may employ a suitably equipped client computer 100 to get on network 200 and access computers coupled thereto. For example, a client computer 100 may be used to access web pages from a web server computer 130. It is to be noted that as used in the present disclosure, the term "computer" includes any type of data processing device including personal digital assistants, digital telephones, wireless terminals, and the like.

A web server computer 130 may host a web site containing information designed to attract end-users surfing on the Internet. A web server computer 130 may host or cooperate with another server that hosts advertisements, downloadable computer programs, a search engine and products available for online purchase. A web server computer 130 may also host or cooperate with an ad server for that delivers advertisements to a client computer 100.

A reported-behavior responsive server computer 132 serves message units for delivery to a client computer 100. The message units may contain advertisements, for example. Message units are further described below. A reported-behavior responsive server computer 132 may also host downloadable computer, programs and files for supporting, updating, or maintaining components on a client computer 100.

Web server computers 130 and reported-behavior responsive server computer 132 are typically, but not necessarily, server computers such as those available from Sun Microsystems, Hewlett-Packard, Dell or International Business Machines. A client computer 100 may communicate with a web server computer 130 or a reported-behavior responsive server computer 132 using client-server protocol. It is to be noted that client-server computing will not be further described here.

The components of a client computer 100 are not illustrated in a separate figure, but are well-understood. In one embodiment, the components of client computer 100 shown in FIG. 1 are implemented in software. It should be understood, however, that components in, the present disclosure may be implemented in hardware, software, or a combination of hardware and software (e.g., firmware). Software components may be in the form of computer-readable program code stored in a computer-readable storage medium such as memory, mass storage device, or removable storage device. For example, a computer-readable storage medium may comprise computer-readable code for performing the function of a particular component. Likewise, computer memory may be configured to include one or more components, which may then be run by a microprocessor. Components may be implemented separately in multiple modules or together in a single module.

As shown in FIG. 1, client computer 100 may include a web browser 110 and a behavior watching program 120. Web browser 110 may be a commercially available web browser or web client running on a client computer 100. In one embodiment, web browser 201 is the Microsoft Internet Explorer™ web browser. In another, it is a Mozilla, Netscape or Apple web browser. Alternatively, a web enabled word processor or presentation program may be monitored by the behavior watcher 120.

The behavior watching program 120 may be downloadable from a message server computer 103. Behavior watching program 120 may be downloaded in conjunction with the downloading of another computer program. For example, behavior watching program 120 may be downloaded to a client computer 100 along with a utility program that is provided free of charge or at a reduced cost. The utility program may be provided to an end-user in exchange for the right to deliver messages to the end-user via behavior watching program 120. In essence, revenue (e.g., advertising fees) from messages delivered to the end-user helps defray the cost of creating and maintaining the utility program. Other components such as operating system components, utility programs, application programs, and the like are not shown for clarity of illustration.

Figure 3:
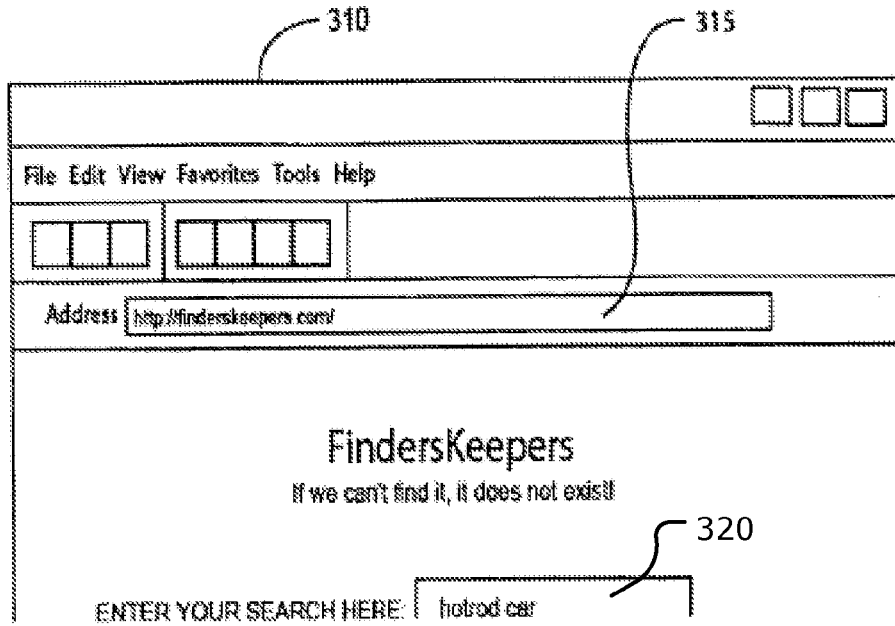
FIG. 3 illustrates browsing to a search engine "FinderSkeepers".

The behavior watcher 120 includes computer-readable program code that compiles a user profile from behavior watching. It monitors web browser 110 for search requests, uniform resource locators (URLs) of web sites visited by an end-user surfing on the Internet and ad click-throughs. FIG. 3 illustrates browsing to a search engine "FindersKeepers". A user invokes a browser 310 and enters the address of the search engine in an address window 315. Of course, links, buttons, a search bar component or a dedicated searching program (for instance, from the systray) can connect a user with a search engine, through a browser or other program. The address remains visible when the page for the web site is displayed. The user enters search terms "hotrod car" in a window 320. A request is sent or "posted" to the search engine.

Figure 4:
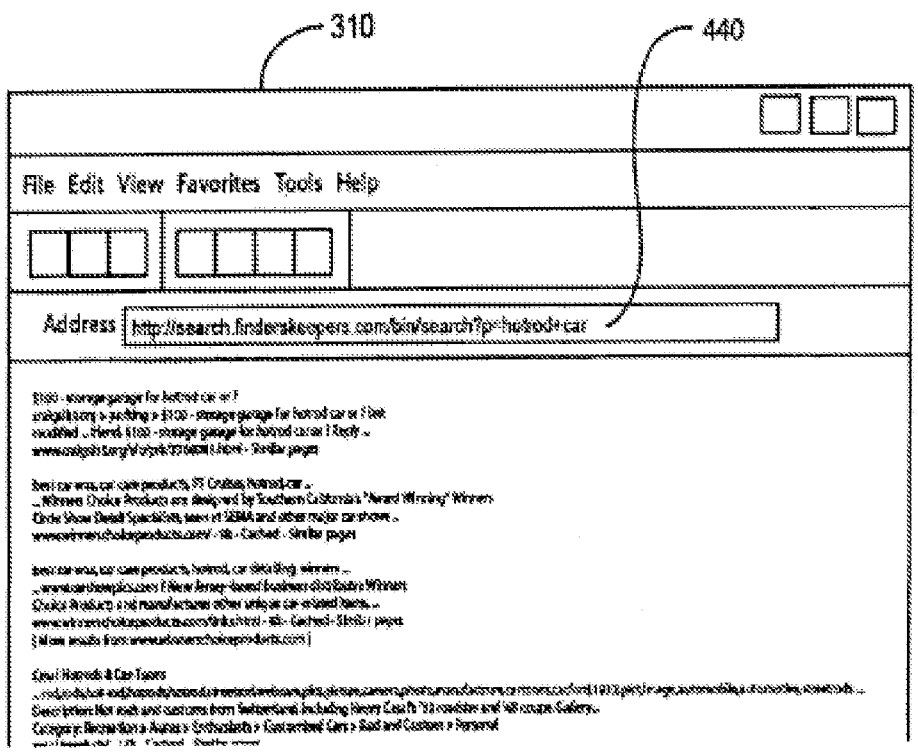
FIG. 4 shows a browser displaying search results.

FIG. 4 shows a browser 310 displaying search results. Part of the behavior watcher 120 may parse a search request, as part of the process of compiling a user profile. In one embodiment the behavior watcher 120 parses a search request URL displayed in the address window of a web browser in response to a search request, to extract one or more keywords. Popular search engines respond to a search request by pointing the web browser employed by the end-user to a web page containing the search result. The URL of that web page may be parsed to extract the keywords chosen by the end-user for his search. For example, performing a search for "hotrod" and "car" in a fictitious search engine referred to herein as "finderskeepers.com" will result in a web browser being pointed to a web page with the URL (440) http://search.finderskeepers.com/bin/search?p=hotrod+car.

The web page with the URL search.finderskeepers.com/bin/search?p=hotrod+car" contains the search result for the keywords "hotrod" and "car". Knowing the URL format employed by finderskeepers.com allows extraction of the words following " . . . /search?p=" and separated by "+". String manipulation functions may be used to extract keywords from the URL. It is to be noted that different search engines may employ different URL formats. Accordingly, a keyword extractor component of the behavior watcher may first parse the URL to determine the name of the search engine, and then employ parsing rules for that search engine. In the present example, keyword extractor may first parse the URL "http://search.finderskeepers.com/bin/search?p=hotrod+car" to get the name of the search engine, which is " . . . finderskeepers.com/ . . . ", and then apply parsing rules for finderskeepers.com. Keyword extractor may take advantage of delimiters and end of string indicators employed by a particular search engine to parse a URL. In one embodiment, keyword extractor includes parsing rules for popular search engines. The keyword extractor also may act on entry or click-throughs of URLs and click-throughs of banner ads, to cross-reference those interest indications to key words. A keyword extractor is further described in the application incorporated by reference.

Figure 5:
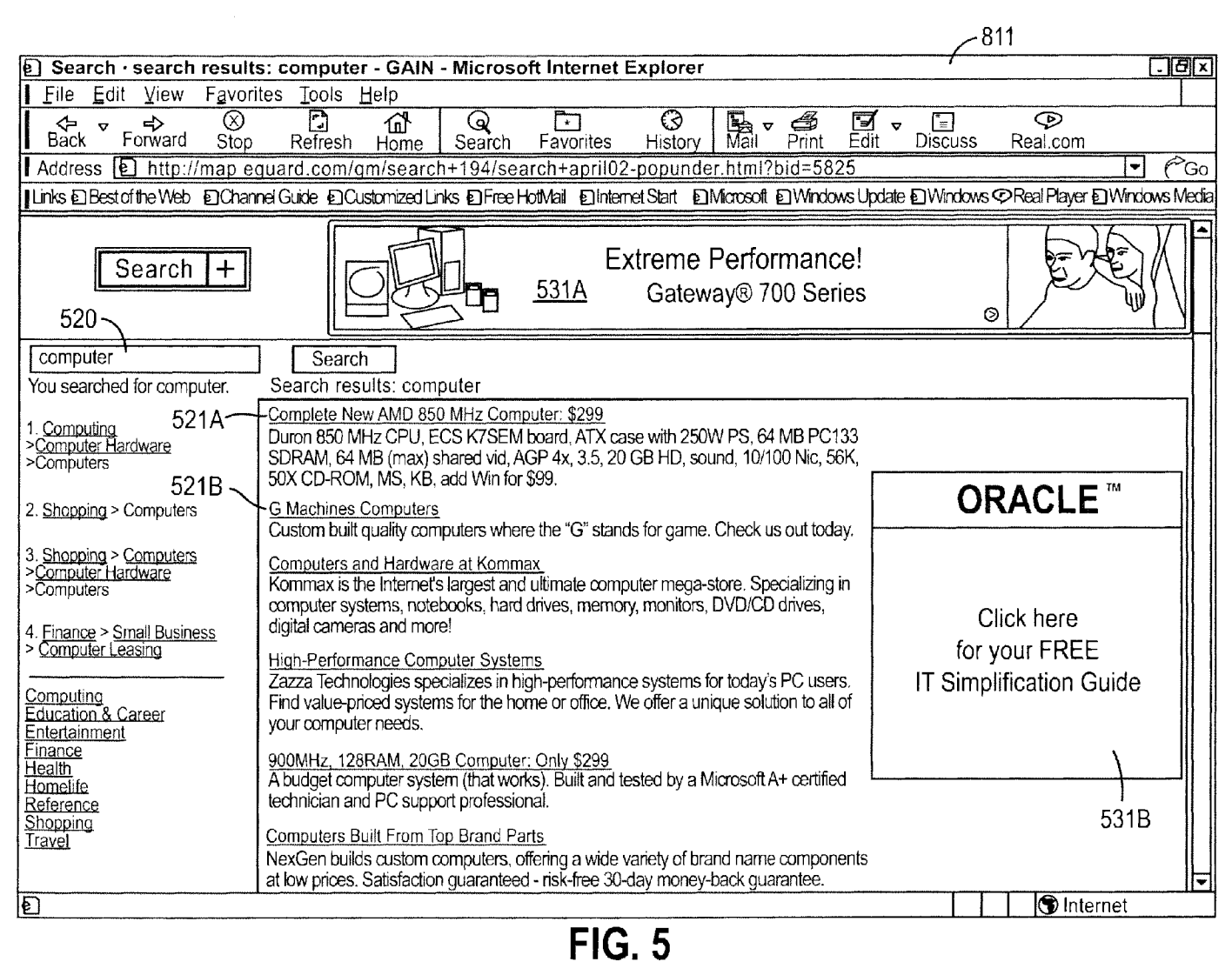

FIG. 5 depicts a page in a familiar browser 310 for a "Search+" web site. The familiar address window appears just below the button bar and above a tool bar. A search window 520 accepts keyword searches. Search results 521A, 521B are displayed in the body of the browser. Banner ads, which a user is welcome to click through, are positioned at the top 531A and right side 531B of the display.

Referring back to FIG. 4, a keyword extractor also may include a keyword file. In one embodiment, keyword file is a text file containing a list of relevant keywords referred to as "an include list" and a list of non-relevant keywords referred to as an "exclude list". Note that keyword file may have also have an include list but not an exclude list or vice versa. Keyword file may be downloadable from a server computer 130 to ensure that client computer 100 always has the most current keyword file. Keywords in the include list can be assigned to categories of interest, whereas keywords in the exclude list have no corresponding categories of interest. Keywords in the include list are processed by a keyword processor, whereas keywords in the exclude list are not processed. In one embodiment, keyword processor processes a keyword by sending the keyword to message server computer 130 to obtain further information about the keyword. By first examining the exclude list before sending keywords to server computer 132, keywords that have no corresponding message units are identified at client computer 100, thereby minimizing traffic to server computer 132. Likewise, traffic to server computer 132 may be minimized by first determining if a keyword is in the include list before sending the keyword to message server computer 103.

TABLE 1

| Include List | Exclude List |
|---|---|
| hotrod | paper |
| car | the |
| books | for |
| computer | Britney |
| cellular | . . . |
| sports | . . . |
| wine | . . . |
| . . . | . . . |

In the example of Table 1, the exclude list includes non-relevant words such as commonly used words that are too general to be useful. The exclude list may also include words that have no commercial value. For example, "Britney" may have no commercial value to most advertisers except those affiliated with or licensed by Britney the pop-star.

In the example of Table 1, the include list includes relevant words. In one embodiment, a word is considered relevant if there is a corresponding message unit for that word. For example, the word "computer" may be relevant if there is a message unit containing an advertisement for a personal computer. Similarly, the word "book" may be relevant if there is a message unit relating to books.

Data collected by the behavior watcher 120 are illustrated by FIGS. 6-11. Data are collected to generate a client-side profile. These profiles allow ad servers, which receive reported user behavior data, to improve ad performance. Advertisers will pay more for ads that are directed to interested customers than for ads that are distributed randomly. Moreover, ad impressions that generate click-throughs generate more revenue than ads that are displayed but evoke no response. Ad performance can be improved either by better targeting or greater success in generating click-throughs.

A client-side profile includes things like category visits, searches, user identification, language and time zone. Indications of user interest are assigned to categories. In one embodiment, 200-300 categories are recognized. Of course, fewer or more categories might be recognized. The more categories recognized, the more data bits required to store category IDs. Potentially, categories could be organized hierarchically. Recency may be recorded by time bins, such as within the last hour, 1-2 hours, 2-4 hours, 4-24 hours, 1-7 days, 7-30 days, 31-60 days. Alternatively, bins or categories for 7-14 days, 0-5 minutes, 5-15 minutes, 15-30 minutes and 30-60 minutes may be of interest. Searches for key words of commercial interest may be more important than some other indications of user interest. The behavior watcher 120 may keep track of the last commercial keyword entered in a search and a time bucket for the last commercial keyword entered. Over a certain outer history limit, the time bucket may be empty. Machine-related information may include a unique machine ID, language settings, time zone of the user, and installation date of the relevant software. Data stored either to persistent memory 122 or cookie memory 124 may be compressed and encrypted to save space and prevent hacking. Compression, beyond the categorization described, and encryption schemes are well known and not described here. Cookies, at least, should include version number so that the server receiving the cookie will understand how to interpret the cookie. Other header information may be supplied as desired. Cookies tracking user behavior are written by the behavior watcher 120, as opposed to the server 130.

Machine information is one type of data that may be stored in persistent memory 122 and cookies 124. The information associated with the machine may include version of the cookie, the time written, a unique ID, a locale (such as a ZIP code, area code or something similar), user's time zone, and an application name, version and installation time. Machine information may be rewritten to memory every 24 hours, every new day, or on some other periodic basis. It may be stored as columns separated by delimiters, then encrypted and compressed.

The behavior watcher may track and summarize visits. It may record, such as to persistent memory 122, each indication of user interest, including use of key words in searches, entry of URLs and click-throughs of URLs and banner ads. Banner ads may be segregated into regular banner ads, site exit banner ads that are triggered when leaving a particular URL, brander banner ads that are triggered when visiting a first URL, then displayed in visiting a second URL, and run of network banner ads that are triggered based on a count of navigations from one URL to the next.

FIG. 6 is an example of a cookie that stores the most recent commercial keyword of interest. This may be the most recent commercial keyword of interest from a search or a keyword associated with a URL or click-through. More than one recent commercial keyword of interest may be stored in one or more cookies, following the example of FIG. 6. One attribute or field of this cookie is the version of the crumb 602. Another is the time written 604, which may be expressed in seconds from 1970 to the time the cookie is written. A commercial flag 606 may be used to categorize the keyword type, for instance between key words that are of current commercial interest and key words that are for sale. The keyword may be included 608, either in text or as a shorthand code. A character set 610 such as UFT-8 may be included to assist with decoding of the keyword 608. This may be important in international applications.

FIG. 7 is an example of summary data maintained by the behavior watcher 120 that may be written to persistent memory 122. In this example, a category ID 802 is a shorthand for a particular category. Bins are allocated for a current period 702, such as a day. The periods may be of equal length for different lengths. In one embodiment, a bit string implements the bins. A history of 60 days may be implemented by 60 bits plus storage for a category ID. Each bin corresponds to a particular time segment. A bit flag indicates whether there was activity related to the category during the particular time segment. At a regular time corresponding to the shortest period represented by any bin, the bit string is updated. Data are shifted into older bins, making room in the most recent bin. Data regarding recent activity are summarized into the most recent bin, labeled zero in the figure. If bins represent unequal amounts of time, special provisions are made at the boundaries between shorter and longer time bins, either algorithmically or by allocating additional storage. For instance, activity during any one-hour segment during a preceding day may result in setting the bit flag in a day-long time segment. The day-long time segment is flag "0" only if the hour segment flag at midnight is "0" when the midnight update takes place. This is an example of an algorithmic provision at the boundary between a one-hour segment and a day-long segment. Alternatively, storage may be allocated for bins to record the number of visits in a particular time segment. This may significantly increase the amount of storage required, without necessarily changing how a reported-behavior aware server 132 responds. Compact storage is preferred when there are hundreds of categories and the practical limit for the size of a cookie is 2K to 4K bytes. Cookies can be sent to a server that archives user activity data. The user activity data can be used for analysis or targeting of ads. With the right user ID information, the user activity data could be matched to data from other sources, such as shopper loyalty programs or market research programs. A bit string can be further summarized by category, shown in FIGS. 8-10.

FIG. 9 illustrates buckets that may be applied to recency of using search words, clicking through, entering URL destinations or other indications of user interest. The most recent visit is recorded by membership in a particular bucket. Fifteen or 16 buckets can be indicated with four bits. In the figure, the buckets are of unequal length. A single, most recent visit record such as illustrated by FIG. 6 or an entry kept in memory can be used to assign a category to a particular bucket.

FIG. 10 illustrates buckets that can be applied to frequency of visits. When the bit string of FIG. 7 is organized by days, activity in a category can be assigned to buckets of different visit frequencies, such as 0, 1, 2, 3, 4 or 5, 6 to 10, 11 to 30, or 31 to 60 days out of the last 60 days in which the user indicated interest. The number of bits set in the bit string is counted and summarized using this categorization, as a measure of user category involvement.

With the categorical coding of recency and user category involvement in mind, we turn to FIG. 8. A single cookie may record data for many category IDs 802. For each category ID, three or more metrics of user interest may be recorded. One or more recency 804 categories can be recorded. The recording of recency can be applied to key words or other kinds of user interest indications, described above. One or more frequency 806 categories can be recorded, applied to key words or other kinds of user interest indications. Banner clicks 808 can be separately categorized by recency, frequency or both. The comments in column 810 are editorial comments to explain the data in the table. Category ID 98409 experienced heavy and recent user interest. Category ID 65625 experienced heavy user interest last month. Category ID 68530 experienced light, recent user interest. Category 147374 experienced light activity last month, which probably also should be reflected by a nonzero value under frequency 806.

The behavior watcher 120 preferably sorts the category history information in FIG. 8 so that the most important categories are listed first. Alternatively, the system could leave the category sorting to the reported-behavior responsive server 132. As illustrated in FIG. 11, a category ID 1102 can be associated with both the category name 1104 and a revenue priority 1106. It may be useful to sort category history information by revenue priority 1106, especially if only a portion of the client-sided user behavior data is transmitted to a reported-behavior responsive server 132.

Figure 12:
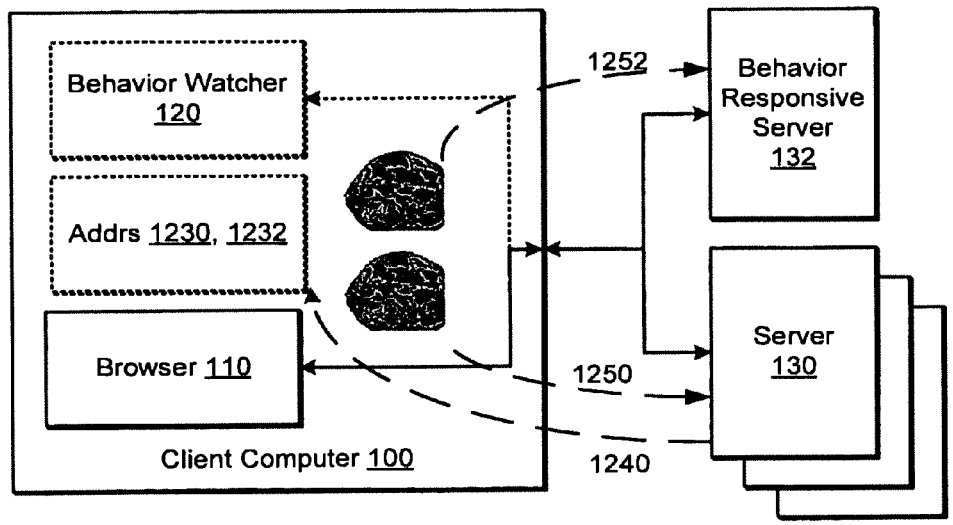
FIG. 12 illustrates interaction among the client computer, a server and a reported-behavior responsive server.

FIG. 12 illustrates interaction among the client computer 100, a server 130 and a reported-behavior responsive server 132. A browser 110 or similar software on the client computer 100 accesses a server 130. Server 130 sends back a web page 1240, which includes embedded references to addresses 1230 and 1232. When the browser 110 accesses web page components identified by the addresses, it may send cookies identified with those addresses 1250, 1252 to a server 130 and a reported-behavior responsive server 132. The server 130 may be different server than one that initially sent the web page 1240. During the exchange of data responsive to the request from the browser 110, the cookie 1252 that is transmitted to the behavior-responsive server 132 conveys data such as depicted in FIG. 8. It also may convey other data, such as the time of the last user interest indications in the category, similar to the information depicted in FIG. 6.

Figure 13:
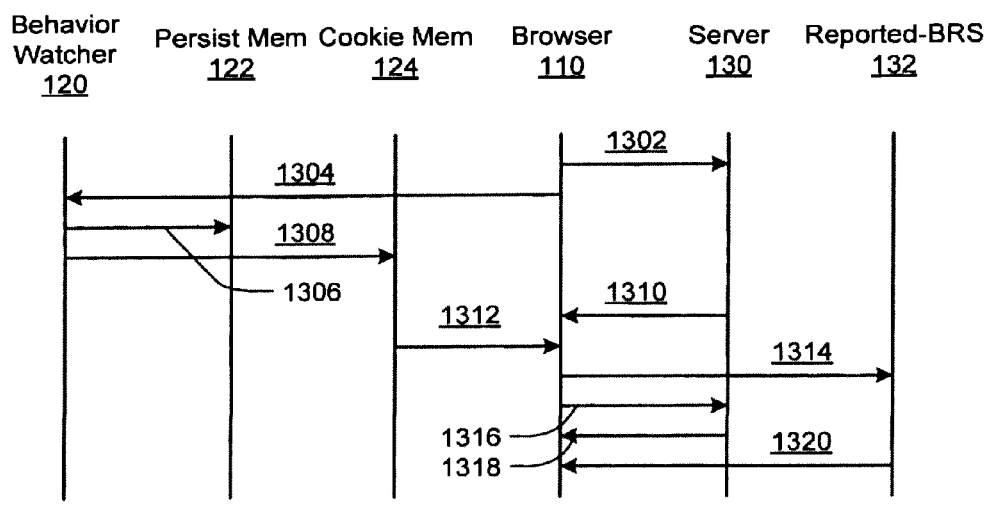
FIG. 13 depicts one embodiment of information flow among the behavior watcher, the browser, one or more servers, one or more reported-behavior responsive servers, persistent memory, and cookie memory.

FIG. 13 depicts one embodiment of information flow among the behavior watcher 120, the browser 110, one or more servers 130, one or more reported-behavior responsive servers 132, persistent memory 122 and cookie memory 124. In this figure, the user indicates their interest in a subject to a browser 110 or similar software. This indication of interest typically results in the browser 110 transmitting a search request, URL or similar message 1302 to a server 130. The behavior watcher 120 receives the indication of interest 1304 from its monitoring of the browser 110. Optionally, it records the indication of interest 1306 to persistent memory 122. Recording to persistent memory may take place immediately, periodically or both. For instance, the most recent keyword, search term, banner click or other indication of interest may be recorded to memory with a date and time stamp. As described above, a periodic history of interests may be updated periodically. The behavior watcher 120 publishes information about user behavior to cookies 124 or similar memory structures that are readily accessible to reported-behavior responsive servers 132 when a browser 110 accesses a server 130 that triggers a message to a reported-behavior responsive server 132 or contacts the server 132 directly. This publishing of behavior may include both publishing information about the most recent indication of user interest and publishing categorical information summarizing recent user interest.

Use of information published by the behavior watcher 120 to accessible memory structures is also illustrated in FIG. 13. Typically, a server 130 returns a web page 1310 to the browser 110. Depending on the addresses embedded in the web page 1310, various cookies 1312 are automatically retrieved by the browser 110. When the web page 1310 includes an address of a reported-behavior responsive server 132, one or more cookies that summarize user behavior and interests observed by the client-side behavior watcher are transmitted 1314 to the server 132. In addition, one or more cookies 1316 may be transmitted to server 130. The reported-behavior responsive server 132 decodes the cookie 1314, determines what message or ad to return to the browser 110 and sends a customized message 1320 that is responsive to the reported behavior 1314 of the user.

One issue with publishing behavioral data to cookies is deletion of cookies. Cookies are automatically deleted by a browser 110 when they reach an expiration date or when there are too many cookies. Users manually delete cookies using browser controls. Many software applications have been developed to analyze and delete certain cookies. Therefore, publication of behavioral data to cookies is sometimes not enough to assure that the resulting memory structures will be accessible to reported-behavior responsive servers 132. It is useful to have a mechanism to republish or restore cookies that have been deleted.

Figure 14:
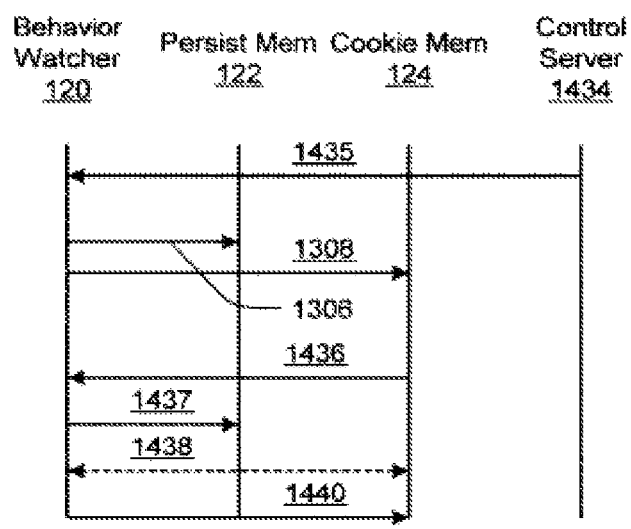
FIG. 14 depicts republication and restoration of cookies.

FIG. 14 depicts republication and restoration of cookies. Republication of cookies that summarize observed user behavior is the simpler case. As described above, the behavior watcher 120 may record observed behavior and interests 1306 to persistent memory 122 and publish similar information 1308 to cookies 124. For republication, the behavior watcher 120 periodically inspects cookie memory 124 to determine whether the cookies have been deleted or damage 1438. Alternatively, the behavior watcher 120 might detect cookie deletion events or possible cookie deletion events and schedule republication following cookie deletion. When it detects that the cookies have been deleted or damaged 1438, it republishes the cookies 1440 to the cookie memory 124. The cookies are again in place as memory structures readily accessible to reported-behavior responsive servers 132.

Backup and restoration of cookies is also illustrated by FIG. 14. A control server 1434 instructs the behavior watcher 120 or a backup and restore component of the behavior watcher regarding cookies to be backed up and restored 1435. The behavior watcher 120 retrieves from cookie memory 124 cookies for which a backup and restore service is to be provided 1436. The behavior watcher 120 records or backs up 1437 the cookie information to persistent memory 122. The behavior watcher 120 need not be aware of the content of the cookies in order to provide this backup service. The cookies need not include observed behavior data and may be directed to ordinary servers 130. The behavior watcher 120 periodically inspects cookie memory to determine whether the cookies have been deleted or damage 1438. Alternatively, the behavior watcher can detect cookie deletion events and schedule restoration of cookies following cookie deletion. When it detects that the cookies have been deleted or damaged 1438, it restores the cookies 1440 to the cookie memory 124. The cookies are again in place as memory structures readily accessible to servers 130.

SOME PARTICULAR EMBODIMENTS

The present invention may be practiced as a method or device adapted to practice the method. The same method can be viewed from the perspective of a behavior summarizing module optionally including a behavior observing module and a summary publishing module. The invention may be an article of manufacture such as media impressed with logic to carry out computer-assisted behavior summarizing optionally including behavior observing module and a summary publishing module.

One embodiment is a method of publishing behavioral data from a client computer via network to an authorized domain. This method includes summarizing observed cross-network user behavior data using a behavior summarizing module operating on a user's computer, wherein the observed cross-network user behavior includes accessing web sites that are not all associated with a particular user behavior data collection network. Alternatively, cross-network may refer to web sites or other content delivery vehicles that are not all associated with a particular portal or a particular virtual storefront or a particular content provider. The behavior further includes at least one of a mouse click-through, enter keystroke or other selection action by the user and at least one keyword derived from context of the selection action. The summarizing includes deriving a categorical metric of the user's degree of interest in subject categories, from the observed cross-network user behavior data, for a multiplicity of subject categories. The method includes publishing the summarized cross-network user behavior data from the behavior summarizing module to a memory structure, wherein the memory structure becomes accessible via a network to a server at an authorized domain when the user uses the network to access the authorized domain. This method may be extended in several ways.

A further aspect of this method includes prioritizing a multiplicity of subject categories, selecting a plurality of the multiplicity of subject categories, and publishing the summarized cross-network behavior data for the plurality of subject categories to a single memory structure. This memory structure, optionally, may be a so-called cookie. Another aspect of this method may include observing the cross-network user behavior data using a behavior watching module operating on the user's computer. The behavior watching module may be integrated with the behavior summarizing module. Alternatively, the two behavior-related modules may be separate modules, even using separate hardware.

The cross-network behavioral data may include user selection of one or more of the following: submission of a search term to a search engine, either using a browser interface or a search engine-specific interface, visiting a portal, visiting a virtual storefront, visiting a content provider, entering a URL in a browser address window, selecting a URL hyperlink, or clicking on a banner ad associated with a link. More generally, the user selection may be any navigation among documents that are linked semantically or by addresses. The meaning given to "cross-network" above also applies here.

Publishing to the memory structure may take place on a periodic basis and/or on an update basis. By an update basis, it is meant that the memory structure update follows detection of the user selection.

Yet another aspect of this method may include receiving at the user's computer advertising targeted using the summarized cross-network user behavior data published to the memory structure that became accessible when the user used the network to access the authorized domain.

The categorizing may include rolling up indicators of visits into non-overlapping categorical time segments of differing lengths. This may be accomplished by representing a plurality of granular time segments with flags to indicate user category involvement and summarizing a portion of the granular time segments by aggregation to the categorical time segments.

Another embodiment is a method of publishing behavioral data collected by a behavior watching module operating on the user's computer, including summarizing cross-network user behavior data recorded to memory. The summarizing includes, for a multiplicity of subject categories, deriving one, two, three or four of the following items: (1) categorizing recency of visiting a web site in the subject category by evaluating a most recent visit time-date indicator; (2) categorizing frequency of user visits to web sites in the subject category by rolling up indicators of visits during seven, ten or more time segments or any number of categorical time segments, which time segments were recorded on a rolling basis; (3) categorizing recency of selection of a banner ad to obtain additional information in the subject category by evaluating a most recent visit time-date indicator; or (4) categorizing frequency of user selections of the banner ad to obtain additional information in the subject category by rolling up indicators of visits during seven, ten or more time segments or any number of categorical time segments, which time segments are tracked on a rolling basis. The method further includes publishing the summarized cross-network behavior data from a behavior summarizing module to memory structure that becomes accessible via a network to a server at an authorized domain when the user uses the network to access the authorized domain.

Any and all aspects of the first embodiment may be applied to the second embodiment.

A related embodiment is a method of republishing a memory structure on a user's computer, wherein the memory structure summarizes cross-network user behavior data and becomes accessible via a network to a server at an authorized domain when the user uses the network to access the authorized domain. This method includes providing a logic to be installed on a user's computer, the logic having access to a storage area for the memory structure, having access to persistent memory distinct from the memory structure storage area, and the logic operating on the user's computer without requiring the user to specifically invoke the logic. This method further includes the logic automatically detecting when the memory structure that summarizes cross-network user behavior data has been deleted or damaged and responding by restoring at least part of the data structure to the data structure storage area from the distinct persistent memory.

One aspect of this embodiment is that the data structure may be a so-called cookie used for HTTP state management. The names of cookies may be used to associate the cookies with authorized domains. The distinct persistent memory may be a registry including name-value pairs or a separate storage area.

A variation on the immediately preceding embodiment is a method of backing up and restoring a memory structure on a user's computer. This method includes providing a logic to be installed on a user's computer, the logic having access to a storage area for the memory structure, having access to persistent memory distinct from the memory structure storage area, and the logic operating on the user's computer without requiring the user to specifically invoke the logic. This method further includes remotely identifying the logic one or more favored memory structures to be backed up and automatically backing up the favored memory structures to the distinct persistent memory. The method further includes automatically detecting that at least one particular favored memory structure has been deleted or damaged and automatically restoring at least part of that particular memory structure to the memory structure storage area using data from the distinct persistent memory. The aspects of the immediately preceding embodiment apply to this embodiment as well.

Device embodiments of these methods may include a memory structure area of memory, a persistent memory distinct from the memory structure storage area and logic operating as part of the user's computer, without requiring the user to specifically invoke the logic, the logic having access to the memory structure storage area and the distinct persistent memory. The device further includes the communications channel connected to the network. The logic is adapted to carry out any of the method embodiments described above using the communications channel.

---

Claims of Provisional Application No. 60/637,684

1 [observing keyword for selection, summarizing and publishing to memory structure]
A method of publishing behavioral data from a client computer via a network to an authorized domain using a cookie, including:
observing cross-network user behavior data using a behavior watching module operating on a user's computer, wherein the cross-network user
behavior
includes accessing web sites that are not all associated with a particular
user behavior data collection network, and
further includes at least one of a mouse click-through, enter keystroke or other selection action and at least one keyword derived from context
of the selection action;
summarizing by subject category for a multiplicity of subject categories
the observed cross-network user behavior data using a behavior summarizing module, including deriving a categorical metric of the user's degree of interest in the subject category from the observed cross-
network user behavior data; and
publishing the summarized cross-network behavior data from the behavior summarizing module to a memory structure,
wherein the memory structure is accessible via a network to a server at
an authorized domain when the user uses the network to access the authorized domain.
2 [keyword for selection previously observed, summarizing and publishing to memory structure]
A method of publishing behavioral data from a client computer via a network to an authorized domain, including:
summarizing observed cross-network user behavior data using a behavior summarizing module operating on a user's computer, wherein

---

Claims of Provisional Application No. 60/637,684 the observed cross-network user behavior includes accessing web sites that are not all associated with a particular user behavior data collection
network, and
further includes at least one of a mouse click-through, enter keystroke or other selection action by the user and at least one keyword derived from context of the selection action;
wherein the summarizing includes deriving a categorical metric of the user's degree of interest in subject categories, from the observed cross-
network user behavior data, for a multiplicity of subject categories; and
publishing the summarized cross-network user behavior data from the behavior summarizing module to a memory structure,
wherein the memory structure becomes accessible via a network to a server at an authorized domain when the user uses the network to access
the authorized domain.
3 The method of claim 2, further including prioritizing a multiplicity of subject categories, selecting a plurality of the multiplicity of subject categories, and publishing the summarized cross-network behavior data
for the plurality of subject categories to a single memory structure.
4 The method of claim 2, further including observing the cross-network user behavior data using a behavior watching module operating on the user's computer.
5 The method of claim 2, wherein the cross-network behavioral data include visits to a plurality of web sites or selections of banner ads that
are not all associated with a particular behavioral data collection network. [portal, virtual storefront, content provider].
6 The method of claim 3, wherein the cross-network behavioral data include behavioral data corresponding to a plurality of visits to web sites or selections of banner ads that are not all associated with a particular behavioral data collection network.
7 The method of claim 2, wherein the cross-network behavioral data include behavioral data corresponding to a plurality of visits to web sites or selections of banner ads that are accessed using a plurality of browsers.
8 The method of claim 2, wherein publishing takes place on a periodic basis.
9 The method of claim 2, wherein publishing takes place on an update basis, after one or more web sites have been visited or one or more banner ads have been selected.
10 The method of claim 2, further including receiving at the user's computer advertising targeted using the summarized cross-network user
behavior data published to the memory structure that became accessible
when the user used the network to access the authorized domain.
11 [summarizing and publishing any of four categories of data]
A method of publishing behavioral data collected by a behavior watching module operating on a user's computer, including:
summarizing cross-network user behavior data recorded to [persistent] memory, the summarizing including, for a multiplicity of subject categories, deriving any one or more of
categorizing recency of visiting a web site in the subject category by evaluating a most recent visit time-date indicator,
categorizing frequency of user visits to web sites in the subject category
by rolling up indicators of visits during ten or more discrete time segments [non-overlapping; daily], which discrete time segments were recorded on a rolling basis [bit string; rolled daily],
categorizing recency of selections of a banner ad to obtain additional information in the subject category by evaluating a most recent visit time-date indicator,
categorizing frequency of user selections of a banner ad to obtain additional information in the subject category by rolling up indicators of
visits during ten or more discrete time segments, which discrete time segments are tracked on a rolling basis;
publishing the summarized cross-network behavior data from a behavior summarizing module to a memory structure that becomes accessible via a network to a server at an authorized domain when the user uses the network to access the authorized domain.

| Claims of Provisional Application No. 60/637,684 |
|---|
| 12 The method of claim 11, further including prioritizing a multiplicity of subject categories, selecting a plurality of the multiplicity of subject categories, and publishing the summarized cross-network behavior data for the plurality of subject categories to a single memory structure.
| 13 The method of claim 11, further including observing the cross-network user behavior data using a behavior watching module operating on a user's computer.
| 14 The method of claim 11, wherein the cross-network behavioral data include visits to a plurality of web sites or selections of banner ads that are not all associated with a particular behavioral data collection network. [portal, virtual storefront, content provider].
| 15 The method of claim 12, wherein the cross-network behavioral data include behavioral data corresponding to a plurality of visits to web sites or selections of banner ads that are not all associated with a particular behavioral data collection network.
| 16 The method of claim 11, wherein the cross-network behavioral data include behavioral data corresponding to a plurality of visits to web sites or selections of banner ads that are accessed using a plurality of browsers.
| 17 The method of claim 11, wherein publishing takes place on a periodic basis.
| 18 The method of claim 11, wherein publishing takes place on an update basis, after one or more web sites have been visited or one or more banner ads have been selected.
| 19 The method of claim 11, further including receiving at the user's computer advertising targeted using the summarized cross-network user behavior data published to the memory structure that became accessible when the user used the network to access the authorized domain.
| 20 A method of backing up and recreating cookies on a user's computer, including: providing logic to be installed on the user's computer, the logic having access to a storage area for cookies, having access to persistent memory distinct from the cookies storage area, and operating without requiring the user to specifically invoke the logic; remotely identifying to the logic one or more favored cookies to be backed up; the logic automatically backing up the favored cookies to the distinct persistent memory; the logic automatically detecting that at least one particular favored cookie has been deleted or damaged; and the logic automatically restoring at least part of the particular favored cookie to the cookies storage area using data from the distinct persistent memory.
| 21 The method of claim 20, wherein the cookies are used for HTTP state management.
| 22 The method of claim 20, wherein names of the cookies associate the cookies with web sites.
| 23 The method of claim 20, wherein the distinct persistent memory is a registry including name-value pairs.
| 24 The method of claim 20, wherein the cookies are encoded and the backing up preserves the encoding without understanding how to decode the cookies.
| 25 The method of claim 20, further including identifying to the logic one or more identifiers for the persistent memory to be used for backing up the cookies.
| 26 The method of claim 20, further including a web server receiving data from the restored particular favored cookie.
| 27 The method of claim 20, wherein the logic is invoked when a browser is started.
| 28 A device operating as part of a user's computer, the device including: a cookies storage area of memory; a persistent memory distinct from the cookies storage area; logic operating as part of the user's computer, without requiring the user to specifically invoke the logic, the logic having access to the cookies storage area and to the distinct persistent memory; a communications channel connected to a network; the logic adapted to

| Claims of Provisional Application No. 60/637,684 |
|---|
| receive through the communications channel identifications of favored cookies that should be backed up, automatically back up the favored cookies from the cookies storage area to the distinct persistent memory; automatically detect that at least one particular favored cookie has been deleted or damaged; and automatically restore at least part of the particular favored cookie to the cookies storage area using the data from the distinct persistent memory.

While the present invention is disclosed by reference to the preferred embodiments and examples detailed above, it is understood that these examples are intended in an illustrative rather than in a limiting sense. Computer-assisted processing is implicated in the described embodiments. It is contemplated that modifications and combinations will readily occur to those skilled in the art, which modifications and combinations will be within the spirit of the invention and the scope of the following claims.

What is claimed is:

1. A computer-implemented method, implemented, at least in part, by hardware in combination with software, the method comprising:
   collecting, using hardware in combination with software on a client computer, cross-network user behavior data related to a user's interactions on the client computer with a plurality of web sites, wherein not all of the plurality of web sites are associated with a content provider, and not all of the plurality of web sites are associated with a portal;
   summarizing the cross-network user behavior data on the client computer, the summarizing including, for a plurality of subject categories, one or more of:
      categorizing recency of the user visiting a web site on the client computer in at least some of the plurality of subject categories,
      categorizing user category involvement from the user visiting the website on the client computer in at least some of the subject categories by rolling up indicators of visits into categorical time segments,
      categorizing recency of selections of at least one banner advertisement on the client computer, and
      categorizing user category involvement from user selections of the at least one banner advertisement on the client computer; and
   publishing the summarized cross-network user behavior data on the client computer to one or more memory structures on the client computer; and
   in response to the user accessing an authorized domain via the client computer via a network, providing at least some of the summarized cross-network user behavior data in the one or more memory structures on the client computer to a server at the authorized domain.

2. The method of claim 1, wherein the categorizing the user category involvement includes rolling up the indicators of visits into non-overlapping categorical time segments of differing lengths.

3. The method of claim 1, wherein the categorizing user category involvement includes representing granular time segments with flags to indicate user category involvement during the granular time segment and summarizing a portion of the granular time segments by aggregation into categorical time segments.

4. The method of claim 1, further comprising:
prioritizing a plurality of subject categories,
selecting at least one subject category of the plurality of subject categories, and
publishing the summarized cross-network behavior data for the plurality of subject categories to a single memory structure.

5. The method of claim 1, wherein the cross-network behavioral data include data relating to visits to the plurality of web sites or selections of banner advertisements that are not all associated with a behavioral data collection network.

6. The method of claim 1, wherein the cross-network behavioral data is further related to selections of banner advertisements that are not all associated with the portal.

7. The method of claim 1, wherein the cross-network behavioral data include data relating to visits to the plurality of web sites or selections of banner advertisements that are not all associated with a virtual storefront.

8. The method of claim 1, wherein the cross-network behavioral data is further related to selections of banner advertisements that are not all associated with the content provider.

9. The method of claim 1, wherein the cross-network behavioral data include data relating to behavioral data corresponding to a plurality of visits to the plurality of web sites or selections of banner advertisements that are not all associated with a behavioral data collection network.

10. The method of claim 1, wherein the publishing takes place on a periodic basis.

11. The method of claim 1, wherein the publishing takes place in response to one or more web site visit or one or more banner advertisements selection.

12. The method of claim 1, further including receiving at the client computer advertising targeted using the summarized cross-network user behavior data published to the one or more memory structures on the client computer.

13. The method of claim 1 wherein the summarizing the cross-network user behavior data on the client computer comprises two or more of:
the categorizing recency of the user visiting the web site on the client computer in the at least some of the plurality of subject categories,
the categorizing user category involvement from the user visiting the website on the client computer in the at least some of the subject categories by the rolling up the indicators of the visits into the categorical time segments,
the categorizing recency of the selections of the at least one banner advertisement on the client computer, and
the categorizing user category involvement from the user selections of the at least one banner advertisement on the client computer.

14. A computer-implemented method, implemented, at least in part, by hardware in combination with software, the method comprising:
observing, by hardware in combination with software on a client computer, cross-network user behavior of a user of the client computer, wherein the cross-network user behavior relates, at least in part, to
the client computer accessing a plurality of web sites that are not all associated with a user behavior data collection network, are not all associated with a content provider, and are not all associated with a portal, and
at least one keyword derived from context of a selection action by the user on the client computer;
selecting a subject category from a plurality of subject categories and deriving a summary metric of the user's degree of involvement in the selected subject category for a particular cross-network user behavior of the user of the client computer;
publishing the summary metric to one or more memory structures on the client computer; and
in response to the user accessing an authorized domain via the client computer via a network, providing at least some of the information in the summary metric in the one or more memory structures from the client computer to a server at the authorized domain.

15. The method of claim 14, wherein data in the memory structure are periodically reported via a network to a server.

16. A computer-implemented method, implemented, at least in part, by hardware in combination with software, the method comprising:
summarizing observed cross-network user behavior data using a behavior summarizing module operating on a client computer, wherein the observed cross-network user behavior includes:
access to web sites that are not all associated with a content provider, a user behavior collection network, and a portal; and
at least one keyword derived from context of the access to the web sites; and
wherein the summarizing for the observed cross-network user behavior includes deriving a summary metric of the user's degree of interest in subject categories from a plurality of subject categories; and
publishing the summary metric from the behavior summarizing module to one or more memory structures; and
providing information in the summary metric in the one or more memory structures from the client computer to a server at an authorized domain in response to the user accessing the authorized domain via the client computer via a network.

17. The method of claim 16, further including:
prioritizing the plurality of subject categories;
selecting at least one subject category of the plurality of subject categories; and
publishing the summarized cross-network behavior data for the plurality of subject categories to a single memory structure.

18. The method of claim 16, wherein the one or more memory structures are accessible via the network to the server at the authorized domain in response to the user accessing the authorized domain.

19. The method of claim 16, wherein the cross-network behavioral data include data relating to behavioral data corresponding to a plurality of visits to the web sites or selections of banner advertisements that are accessed using more than one browser on the client computer.

20. The method of claim 16, further including receiving at the client computer advertising targeted using the summarized cross-network user behavior data published to the one or more memory structures that became accessible in response to the user accessing the authorized domain.

* * * * *